US011193751B2

(12) United States Patent
Froggatt et al.

(10) Patent No.: US 11,193,751 B2
(45) Date of Patent: *Dec. 7, 2021

(54) METHOD AND APPARATUS FOR MOTION COMPENSATION IN INTERFEROMETRIC SENSING SYSTEMS

(71) Applicant: Intuitive Surgical Operations, Inc., Sunnyvale, CA (US)

(72) Inventors: Mark E. Froggatt, Blacksburg, VA (US); Alexander K. Sang, Blacksburg, VA (US); Dawn K. Gifford, Blacksburg, VA (US); Justin W. Klein, Lansing, MI (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 555 days.

This patent is subject to a terminal disclaimer.

(21) Appl. No.: 16/044,559

(22) Filed: Jul. 25, 2018

(65) Prior Publication Data

US 2018/0356203 A1 Dec. 13, 2018

Related U.S. Application Data

(63) Continuation of application No. 15/793,177, filed on Oct. 25, 2017, now Pat. No. 10,054,420, which is a (Continued)

(51) Int. Cl.
*G01B 9/02* (2006.01)
*G01L 1/24* (2006.01)
(Continued)

(52) U.S. Cl.
CPC ....... *G01B 9/0207* (2013.01); *G01B 9/02004* (2013.01); *G01B 9/0209* (2013.01);
(Continued)

(58) Field of Classification Search
CPC ............ G01B 9/02076; G01B 9/02083; G01B 9/02004; G01B 9/02072; G01B 9/0207;
(Continued)

(56) References Cited

U.S. PATENT DOCUMENTS 5,798,521 A 8/1998 Froggatt
6,545,760 B1 4/2003 Froggatt et al.
(Continued)

FOREIGN PATENT DOCUMENTS

CN 1851433 A 10/2006
CN 101441092 A 5/2009
(Continued)

OTHER PUBLICATIONS

Extended European Search Report for Application No. 18162312.5 dated May 24, 2018, 8 pages.
(Continued)

*Primary Examiner* — Yoshihisa Ishizuka
(74) *Attorney, Agent, or Firm* — Schwegman Lundberg & Woessner, P.A.

(57) ABSTRACT

Interferometric measurement signals are detected by a single optical interferometric interrogator for a length of a sensing light guide and an interferometric measurement data set corresponding to the interferometric measurement signals is generated. The interferometric measurement data set is transformed into a spectral domain to produce a transformed interferometric measurement data set. The transformed interferometric measurement data set is compared to a baseline interferometric data set to identify a time-varying signal corresponding to a time-varying disturbance. The baseline interferometric data set is representative of the sensing light guide not being subjected to the time-varying disturbance. A compensating signal is determined from the time-varying signal and used to compensate at least a
(Continued)

portion of the interferometric measurement data set for the time-varying disturbance as part of producing a measurement of the parameter.

24 Claims, 20 Drawing Sheets

Related U.S. Application Data continuation of application No. 14/362,759, filed as application No. PCT/US2012/067554 on Dec. 3, 2012, now Pat. No. 9,841,269.

(60) Provisional application No. 61/566,860, filed on Dec. 5, 2011, provisional application No. 61/614,662, filed on Mar. 23, 2012.

(51) Int. Cl.
  *G01M 11/00* (2006.01)
  *G01B 11/16* (2006.01)
  *G01D 5/353* (2006.01)
  *G01B 11/06* (2006.01)

(52) U.S. Cl.
  CPC ..... *G01B 9/02069* (2013.01); *G01B 9/02072* (2013.04); *G01B 9/02076* (2013.01); *G01B 9/02083* (2013.01); *G01B 11/0658* (2013.01); *G01B 11/18* (2013.01); *G01D 5/3537* (2013.01); *G01D 5/35358* (2013.01); *G01L 1/242* (2013.01); *G01M 11/3172* (2013.01); *G01D 5/35329* (2013.01)

(58) Field of Classification Search
  CPC ............... G01B 11/18; G01B 11/0658; G01B 9/02069; G01B 9/0209; G01L 1/242; G01L 39/0209; G01L 39/0207; G01M 11/3172; G01D 5/35358; G01D 5/3537; G01D 5/35329
  See application file for complete search history.

(56) References Cited

U.S. PATENT DOCUMENTS

| | | | |
|---|---|---|---|
| 6,566,648 | B1 | 5/2003 | Froggatt |
| 7,330,245 | B2 | 2/2008 | Froggatt |
| 7,515,276 | B2 | 4/2009 | Froggatt et al. |
| 7,538,883 | B2 | 5/2009 | Froggatt |
| 7,772,541 | B2 | 8/2010 | Froggatt et al. |
| 7,781,724 | B2 | 8/2010 | Childers et al. |
| 8,004,686 | B2 | 8/2011 | Froggatt et al. |
| 9,841,269 | B2 | 12/2017 | Froggatt et al. |
| 10,054,420 | B2 | 8/2018 | Froggatt et al. |
| 2002/0089671 | A1 | 7/2002 | Hill |
| 2003/0174338 | A1 | 9/2003 | Baney et al. |
| 2004/0174526 | A1 | 9/2004 | Tang |
| 2006/0119857 | A1 | 6/2006 | Steffens et al. |
| 2006/0274322 | A1 | 12/2006 | Chu et al. |
| 2007/0171425 | A1 | 7/2007 | De et al. |
| 2007/0254592 | A1* | 11/2007 | McCallister ............... H03F 3/24 455/67.11 |
| 2010/0145648 | A1 | 6/2010 | Moore et al. |
| 2011/0109898 | A1 | 5/2011 | Froggatt et al. |
| 2011/0247427 | A1 | 10/2011 | Froggatt et al. |
| 2011/0310378 | A1 | 12/2011 | Froggatt et al. |
| 2011/0317148 | A1 | 12/2011 | Froggatt et al. |
| 2012/0069347 | A1* | 3/2012 | Klein ................... G01B 21/045 356/477 |
| 2014/0336973 | A1 | 11/2014 | Froggatt et al. |
| 2018/0058838 | A1 | 3/2018 | Froggatt et al. |

FOREIGN PATENT DOCUMENTS

| | | |
|---|---|---|
| EP | 1347265 A2 | 9/2003 |
| WO | WO-2006068875 A2 | 6/2006 |

OTHER PUBLICATIONS

Extended European Search Report for Application No. 12855449.0 dated Jul. 6, 2015, 7 pages.
International Search Report and written openion for Application No. PCT/US2012/067554, dated Mar. 11, 2013, 8 pages.
Sagiv O.Y., et al., "Correcting for Spatial-Resolution Degradation Mechanisms in OFDR via Inline Auxiliary Points", Optics Express, Nov. 27, 2012-Dec. 3, 2012, vol. 20 (25), pp. 27465-27472. XP55197535, ISSN: 1094-4087, DOI 10.1364/0E.20.027465.

* cited by examiner

METHOD AND APPARATUS FOR MOTION COMPENSATION IN INTERFEROMETRIC SENSING SYSTEMS

PRIORITY APPLICATION

This application is a continuation of U.S. patent application Ser. No. 15/793,177, filed Oct. 25, 2017, which is a continuation of U.S. patent application Ser. No. 14/362,759, filed Jun. 4, 2014 (issued as U.S. Pat. No. 9,841,269), which is the U.S. national phase of International Application No. PCT/US2012/067554, filed Dec. 3, 2012, which designated the U.S. and claims priority from U.S. provisional patent application Ser. Nos. 61/566,860, filed on Dec. 5, 2011, and 61/614,662, filed on Mar. 23, 2012, the entire contents of each of which are incorporated herein by reference.

TECHNICAL FIELD

The technology relates to interferometric sensing applications. One example application is to Optical Frequency Domain Reflectometry (OFDR) sensing applications.

BACKGROUND

Optical Frequency Domain Reflectometry (OFDR) has proven to be an effective system for measuring strain with high spatial resolution in optical fiber. See, e.g., U.S. Pat. Nos. 6,545,760; 6,566,648; 5,798,521; and 7,538,883. This high resolution capability has proven very useful in shape sensing applications. See, e.g., U.S. Pat. Nos. 7,772,541; 7,781,724; and U.S. Patent application 20110109898. Simpler strain sensing applications in single core fiber are described in U.S. Patent Application 20110247427.

OFDR achieves high spatial resolutions by acquiring data over a wide frequency range as a laser is tuned. In most applications, this tuning takes place over time as the laser is swept through a range of frequencies. It is assumed using this technique that the fiber under test is static, or unchanging, during the time of the sweep. If, however, the system being measured varies during the time that the laser is swept, the resulting measurement can be degraded. Such changes can be due to movement of the fiber under test or movement of the fiber optic leads that connect the fiber under test to the instrument. It would be desirable to achieve a higher quality measurement in the presence of such time varying changes.

SUMMARY

Example embodiments include methods and an optical interrogation system for measuring a parameter of a sensing light guide subjected to a time-varying disturbance. An example time-varying disturbance is motion of the sensing light guide. The optical interrogation system includes an optical interferometric interrogator and optical detection circuitry, coupled to the optical interferometric interrogator, for detecting optical interferometric measurement signals for a length of the sensing light guide. Data processing circuitry receives interferometric measurement signals from the optical detection circuitry and generates an interferometric measurement data set for the length of the sensing light guide. The interferometric measurement data set is transformed into the spectral domain, and a time varying signal is determined from the transformed interferometric measurement data set. A compensating signal is determined from the time varying signal and used to compensate the interferometric measurement data set for the time-varying disturbance to enhance the measurement of the parameter.

In one example implementation, the optical interrogation system is an optical frequency domain reflectometry (OFDR)-based system that includes an interrogating light source, and wherein the optical interferometric measurement signals indicate back scatter amplitude as a function of time along the sensing light guide.

In a non-limiting embodiment, the processing circuitry determines the time-varying signal by comparing the interferometric measurement data set to an interferometric reference data set. Interferometric measurement data set is determined for a reflective event in the interferometric measurement data set and received interferometric data is windowed around the reflective event. The time varying signal may be a phase signal, in which case, the data processing circuitry is configured to extract the phase signal from the transformed interferometric measurement data set by unwrapping the phase signal and determine a non-linear signal that describes the time-varying disturbance to the sensor by removing a linear fit from the unwrapped phase signal. In this example, the non-linear signal is the compensating signal. The data processing circuitry may then subtract the non-linear signal from the interferometric measurement data set to compensate the interferometric measurement data set for the time-varying disturbance.

In another example embodiment, where the time varying signal is a phase signal, the data processing circuitry is configured to extract the phase signal from the transformed interferometric measurement data in the spectral domain by comparing against a baseline data set in the spectral domain.

In other example embodiments, the data processing circuitry is configured to: divide the interferometric measurement data set into multiple measurement data segments; transform each of the segments; combine multiple ones of the transformed measurement segments with corresponding reference spectral data segments; average the combined segments; determine a phase response from the averaged segments; and determine the time varying signal based on the phase response. Furthermore, the data processing circuitry may be configured to determine a strain applied to measurement data segments, where the strain indicates an amount of misalignment between responses of adjacent measurement data segments and use the measured strain to align responses of measurement data segments in the spectral domain.

In another example embodiment, the data processing circuitry is configured to compare each data segment to a corresponding reference data segment in the spectral domain; determine a temporal delay that indicates an amount of misalignment between reference data segments and data segments in the temporal domain; and use the measured temporal delay to align reference data segments and data segments in the temporal domain.

In an example where the sensing light guide is an optical fiber, wherein the data processing circuitry may be configured to compensate the interferometric measurement data set for a strain on the optical fiber.

In a preferred but still example embodiment, the data processing circuitry is configured to determine motion, temporal delay, and strain along the sensing light guide and to compensate for accumulated motion, temporal misalignment, and strain along the sensing light guide.

DETAILED DESCRIPTION

Figure 1:
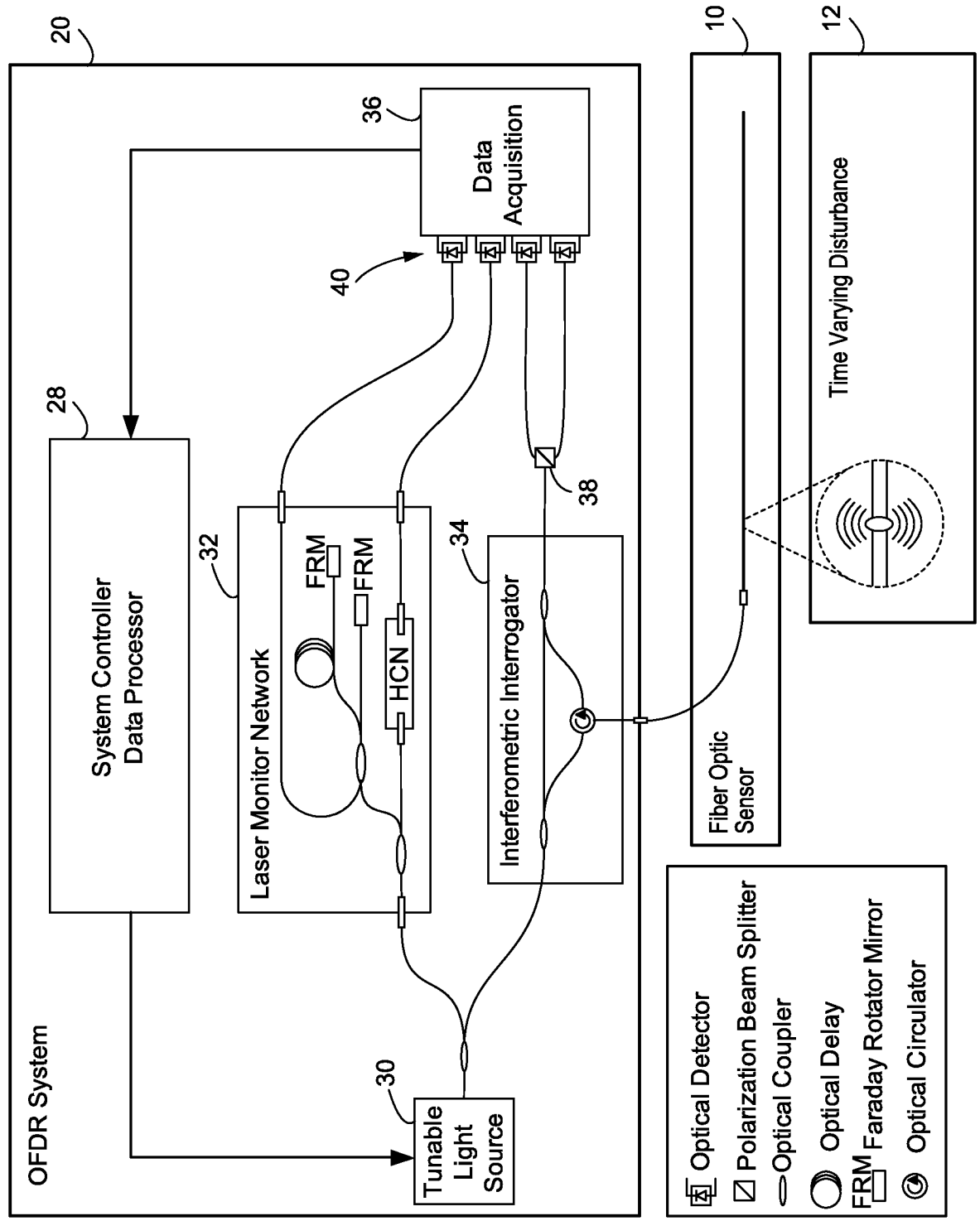
FIG. 1 is a non-limiting example of an Optical Frequency Domain Reflectometer (OFDR)-based sensing system where the sensor experiences a time varying disturbance.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in some figures. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated blocks may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology in this application provides an OFDR-based method and apparatus that compensates for sensor motion. The term sensor includes any waveguide to which OFDR-based measurement techniques may be applied. A time varying signal that distorts an OFDR measurement includes any form of motion of the sensor that occurs over a timescale comparable to that of the OFDR measurement. A vibration is one non-limiting example while a sudden movement is another. A vibration of constant frequency and amplitude has a distinct profile in an OFDR measurement while jarring of the laboratory table during an OFDR measurement has a less defined profile. In both cases, the motion can be detrimental to the accuracy of the intended measurement. Thus, the inventors realized that an approach must be developed to handle a wide range of movement that could be experienced by a given sensor in a deployed sensing environment. The term "motion" is used to encompass any type of error source that varies the position of the sensing fiber during an OFDR measurement.

OFDR is highly effective at performing high resolution distributed measurements of a scattering profile along the length of a waveguide. Scattering of light along the waveguide is related to the local index of refraction at a given location. Two consecutive measurements can be compared to detect local changes of index of refraction along the length of the waveguide by detecting changes in the scattering profile.

FIG. 1 is a non-limiting example setup of an OFDR system 20 used to monitor local changes of index of refraction along the length of a fiber optic sensor 10 useful in one or more measurement and/or sensing applications. In some applications, the fiber optical sensor functions as a sensor, and in other applications, it may be a device under test (DUT) or other entity. A time varying disturbance or motion 12 is shown impacting a particular location of the fiber 10 (the term fiber is used for convenience, but the technology applies to any suitable waveguide). A tunable light source 30 is swept through a range of optical frequencies. This light is split with the use of optical couplers and routed to two separate interferometers. The first interferometer serves as an interferometric interrogator 34 which is connected to the sensing fiber 10. Light enters the sensing fiber 10 through the measurement arm of the interferometric interrogator 34. Scattered light along the length of the fiber 10 is then interfered with light that has traveled along the reference arm of the interferometric interrogator 34. The second interferometer within a laser monitor network 32 measures fluctuations in the tuning rate as the light source 30 scans through a frequency range. The laser monitor network 32 also contains a Hydrogen Cyanide (HCN) gas cell which is used to provide absolute wavelength reference throughout the measurement scan. A series of optical detectors 40 converts detected light signals from the laser monitor network 32, gas cell HCN, and the interference pattern from the sensing fiber 35 into electrical signals for a data acquisition unit 36. A data processor 28 uses the acquired electrical signals from the data acquisition unit 36 to extract a scattering profile along the length of the sensor 10 as is explained in more detail in conjunction with FIG. 2.

Figure 2:
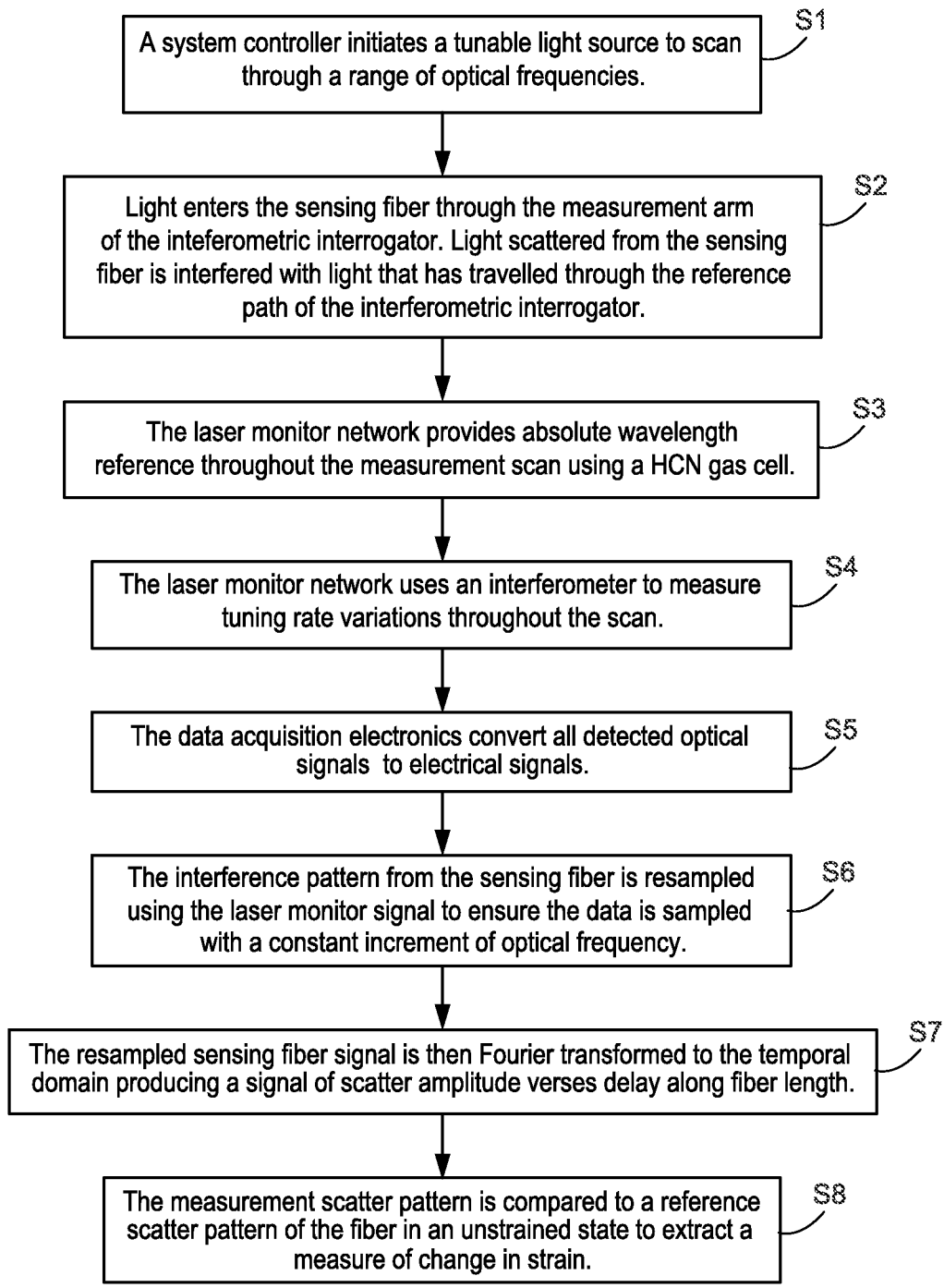
FIG. 2 is a flowchart diagram of non-limiting, example distributed measurement procedures using an OFDR system.

FIG. 2 is a flowchart diagram of non-limiting, example distributed measurement procedures using an OFDR system. In step S1, the tunable light source is swept through a range of optical frequencies and directed into the sensor 10 via the measurement arm of the interferometric interrogator (step S2). Scattered light along the length of the sensor 10 interferes with light that has traveled through the reference path of the interferometric interrogator. An absolute wavelength reference is provided for the measurement scan (step S3), and tuning rate variations are measured (step S4). Optical detectors convert detected optical signals into electrical signals (step S5) for processing by the data processor 28. The interference pattern of the sensing fiber is preferably resampled using the laser monitor signal to ensure the detected signals are sampled with a constant increment of optical frequency (step S6). Once resampled, a Fourier transform is performed to produce a sensor 10 scatter signal in the temporal domain. In the temporal domain, the scatter signal depicts the amplitude of the scattering events as a function of delay along the length of the sensor 10 (step S8). Using the distance light travels in a given increment of time, this delay is converted to a signal measure of length along the sensor 10. In other words, this signal depicts each scattering event as a function of distance along the sensor 10. The sampling period is referred to as the spatial resolution and is inversely proportional to the frequency range that the tunable light source was swept through during the measurement.

As the sensing fiber 10 is strained, local scatters shift as the fiber changes in physical length. It can be shown that these distortions are highly repeatable. Hence, an OFDR measurement can be retained in memory that serves as a reference pattern of the fiber in an unstrained state. A subsequent measurement can be compared to this reference pattern to gain a measure of shift in delay of the local scatters along the length of the sensing fiber. This shift in delay manifests as a continuous, slowly varying optical phase signal when compared against the reference scatter pattern. The derivative of this optical phase signal is directly proportional to change in physical length of the sensing core. Change in physical length can be scaled to strain producing a continuous measurement of strain along the sensing fiber 10.

As detailed above, during an OFDR measurement the optical interference between a reference path and a measurement path is recorded as a laser is swept through a range of optical frequencies. The resulting interference pattern at the optical detectors of the system contains information about both the amplitude and the phase of the light reflected from the sensing fiber. The phase and amplitude of the light is recorded as a function of time through the laser sweep. A basic assumption of the system is that the interferometer system under interrogation, which includes the sensing fiber 10, does not change during the sweep, and that the phase and amplitude response of the system as a function of optical frequency is encoded in time as the laser is swept. Therefore, if the laser frequency is known as function of time, the phase and amplitude response of the system are known as a function of laser wavelength.

Figure 3:
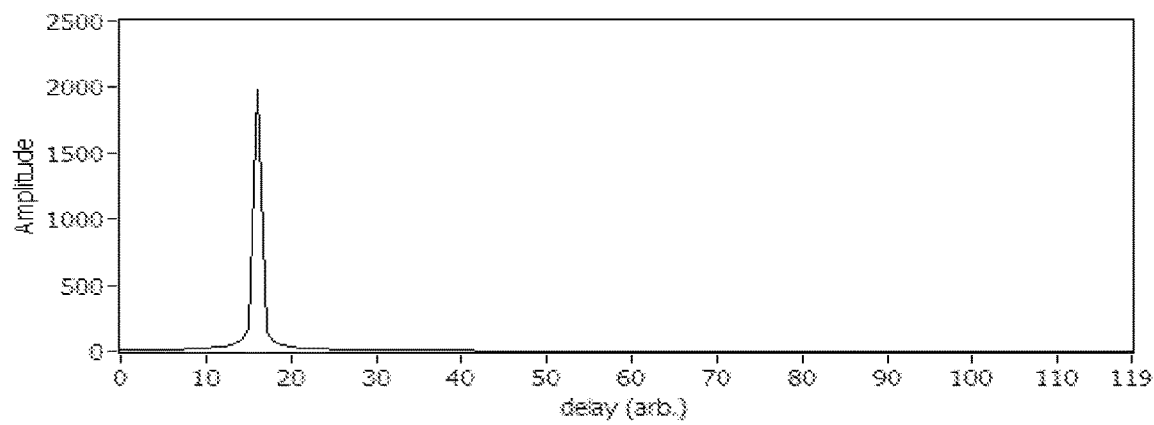
FIG. 3 is a plot of the theoretical amplitude vs. optical delay of an ideal, single reflection peak as measured using OFDR.

But if the system is not stationary during a measurement, the measurement is distorted. Consider for example the response of a single reflection as the laser is swept linearly with time. This single reflection event results in sinusoidal interference fringes at the detection electronics. The Fourier transform of the interference signal from a single reflector gives a single clean peak as a function of optical delay. FIG. 3 plots a theoretical amplitude vs. optical delay of an ideal, single reflection peak as measured using OFDR.

Figure 4:
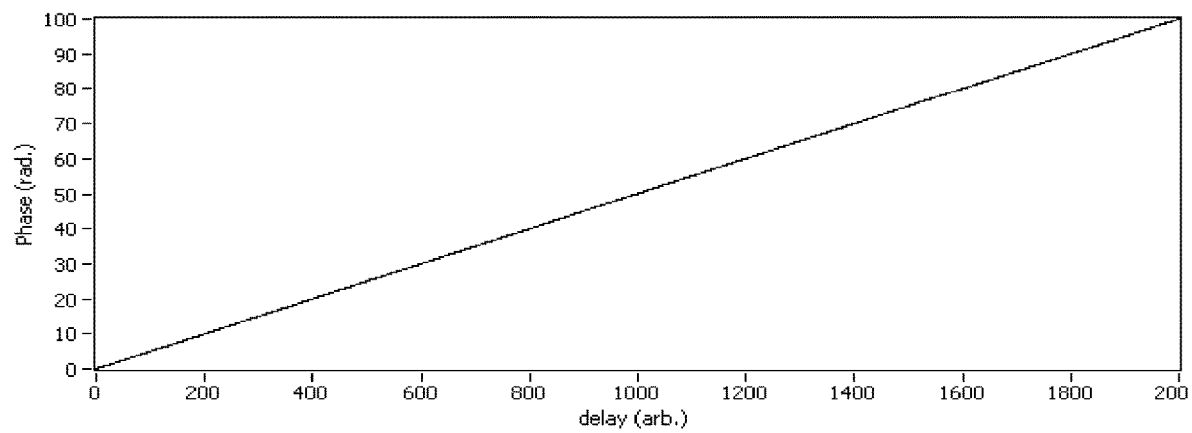
FIG. 4 is a plot of the phase shown in FIG. 3 after being unwrapped showing a linear phase response.

The position of the reflection in delay is proportional to the magnitude of the phase slope in the spectral domain. Further, by definition, an ideal reflection from a single event in the temporal domain has a linear phase slope in the spectral domain. As an example, the spectral domain phase is plotted "unwrapped" in FIG. 4. Unwrapping can be thought of as light moves along a fiber, the optical phase increases. In the complex plane, as the phase increases and moves around the unit circle, it makes one revolution and continues on the next. Unwrapping the phase effectively linearizes this revolving phase signal by keeping track of the total number of complete revolutions to gain a measure of the total optical phase change.

Figure 5:
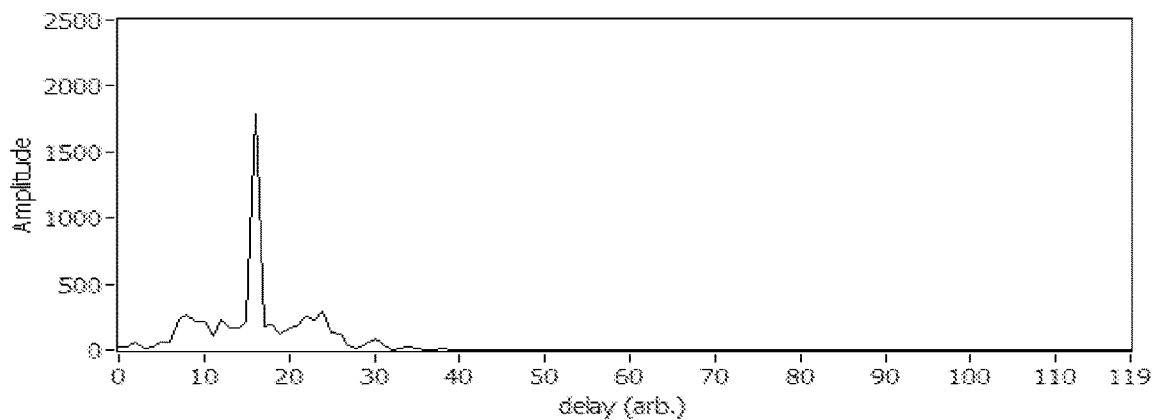
FIG. 5 is a plot of the amplitude vs. delay from a single reflector where the phase has been distorted during the acquisition sweep by some time varying change.

Now consider the case where the optical delay between the reflection of this event and the beam recombination in the interferometer changes, i.e., where the phase has been distorted by some time varying change as the laser is swept. As shown in FIG. 5, this results in an additional phase modulation on the measured interference signal. In the presence of this time-dependent phase modulation, the resulting Fourier transform of the interference signal is distorted as illustrated in FIG. 5. The peak is no longer "clean," with noise appearing around the base of the peak.

Figure 6:
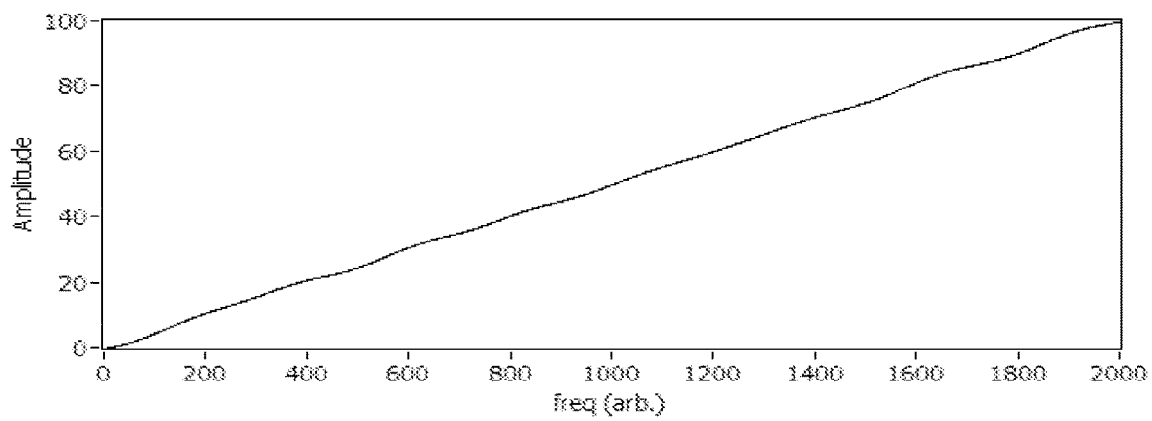
FIG. 6 is a plot of the phase vs. optical frequency of the distorted peak shown in FIG. 5.

FIG. 6 plots the phase vs. optical frequency of the distorted peak shown in FIG. 5. The spectral domain phase of this distorted peak shows small departures from linear phase. These deviations from linearity indicate that the position of the sensing fiber was not constant as the OFDR system performed a measurement. These deviations from a linear phase response in the spectral domain, and the resulting distortion of the ideal peak are problematic for distributed strain measurements. As described above, a distributed OFDR strain measurement is compared to a baseline reference scan of the sensing fiber, e.g., by performing a cross correlation. Distortion of a measurement as a result of motion of the sensor greatly diminishes the accuracy of this comparison. The inventors recognized this problem and developed technology to compensate for the effects of motion from a measurement to improve the accuracy of OFDR measurements.

As a starting point to the solution, the inventors recognized that the fundamental nature of an OFDR measurement allows efficient and effective removal of motion effects from an OFDR measurement. During OFDR acquisition, the magnitude of the phase response in the spectral domain from an ideal, single reflective event in the delay domain is proportional to the delay of that event. Thus, the phase modulation must be additive along the length of the sensor. In other words, the phase modulation seen by any point in the fiber is the sum of all of the phase modulations in the fiber before the point of interest. This means that measuring the phase modulation at any one point in the optical fiber provides an ability to correct for these modulations along the remaining portion of the fiber.

Figure 7:
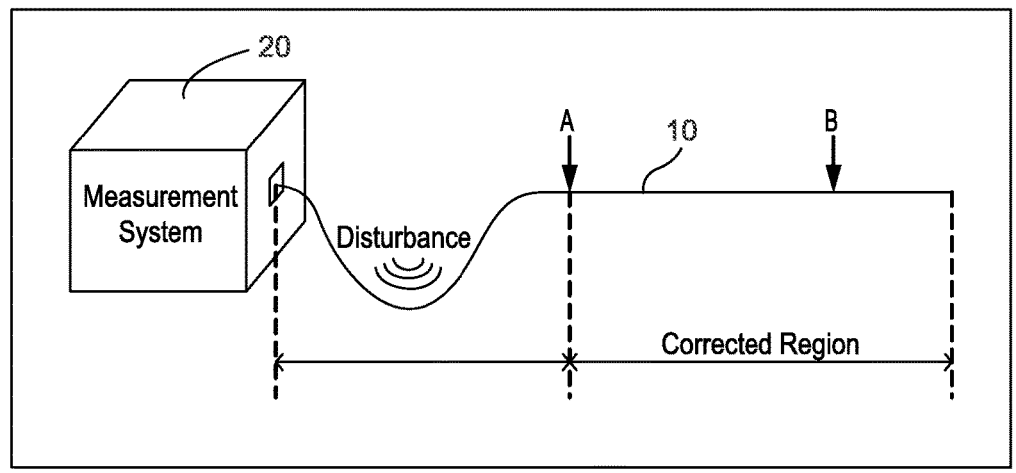
FIG. 7 is a non-limiting example diagram showing that a correction measured at point A can correct all subsequent points for disturbances between the measurement point A and the instrument.
Figure 8:
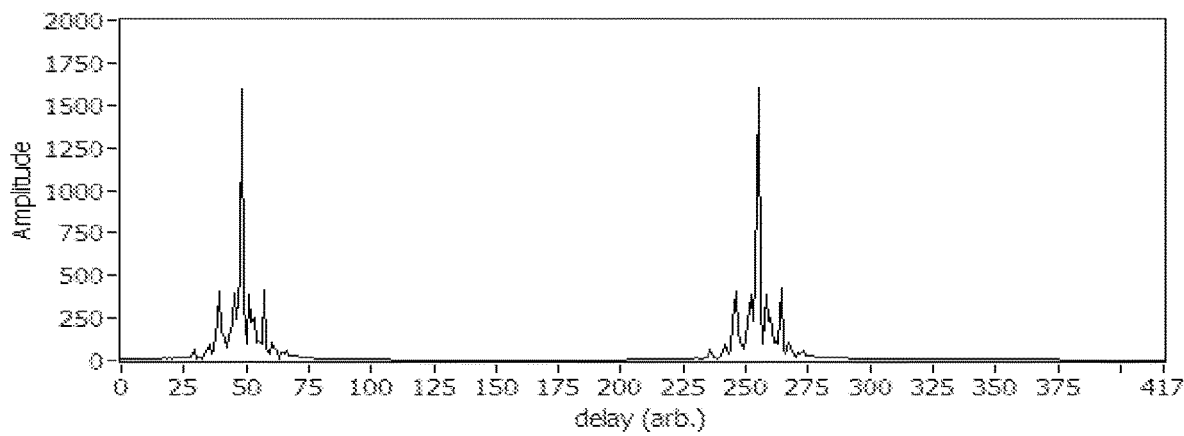
FIG. 8 is a plot of the amplitude vs. delay from two reflection events where both peaks are distorted by some time varying phase in the optical frequency domain.

FIG. 7 is a diagram showing that a correction measured at point A can correct all subsequent points for disturbances between the measurement point A and the OFDR instrument. In other words, by measuring motion at a point A in the sensing fiber 10, all effects of motion between the point A and the instrument may be corrected for the remaining length of the sensor 10. Hence, a measurement at point B will no longer be affected by the motion distortion before point A. This concept is further illustrated in FIG. 8 by observing the distortion of the reflections at both point A and point B in the delay domain due to a time varying distortion before point A. The peaks have both been distorted by some time varying phase in the optical frequency domain.

If it is known there is only a single reflection at or around index 50, then the complex data set associated with this reflection, i.e., the points from zero to 100, may be used to characterize the vibrations (phase modulations) that occurred leading up to this reflection. Removing these vibration effects from the data set removes that distortion as observed in both reflective events at point A and point B along the fiber 10.

Figure 9:
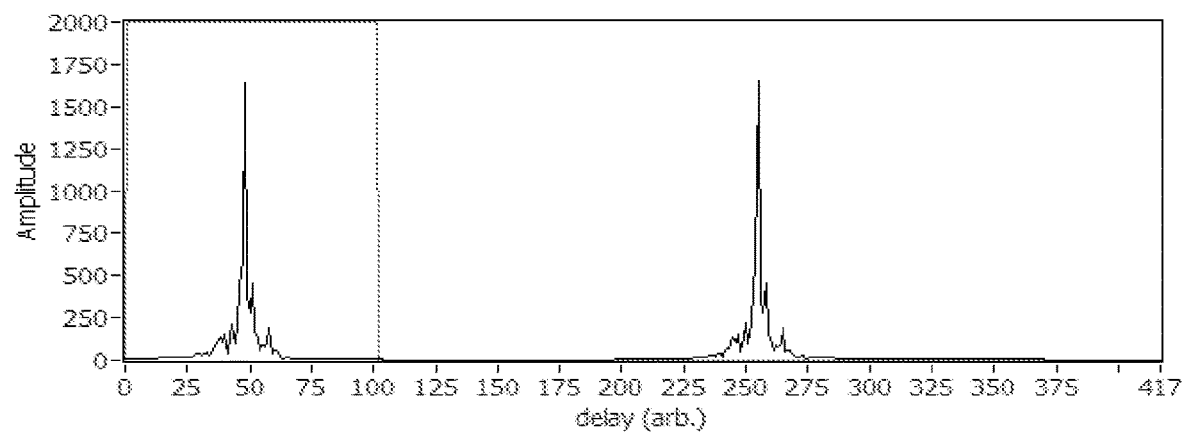
FIG. 9 is the plot in FIG. 8 with a window is shown around the reflection peak at index 50.
Figure 10:
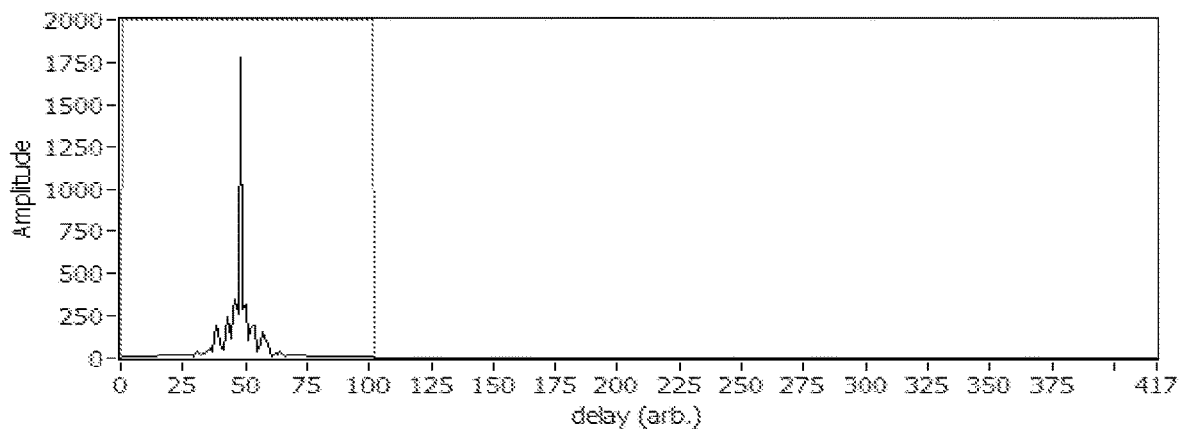
FIG. 10 shows the window in FIG. 9 showing information only from the first reflection peak.
Figure 11:
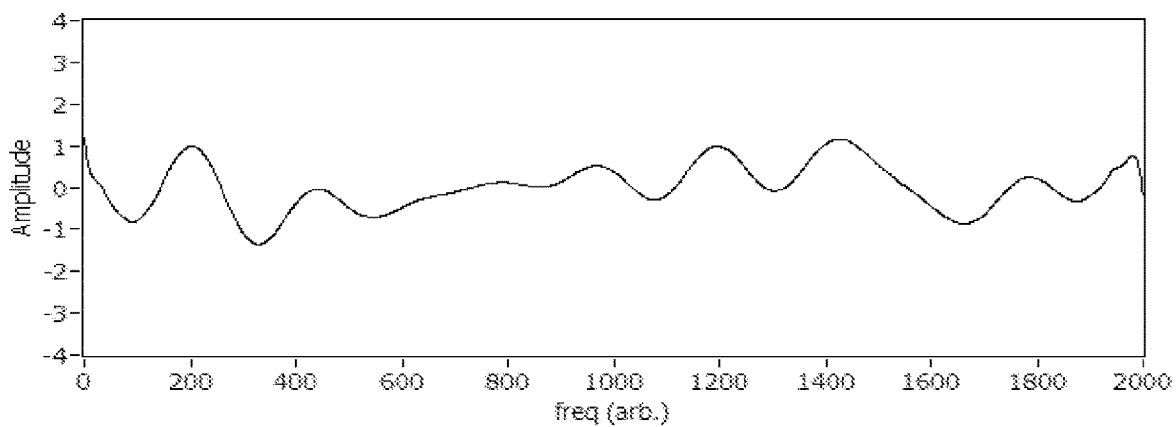
FIG. 11 plots phase distortion calculated from the Fourier transform of the windowed data in FIG. 10.

In this case, vibration information from the first peak is obtained by windowing around that peak as shown by the rectangular window centered around the reflection peak at index 50 in FIG. 9. After the multiplication, no information from the other peak remains. Recall that the information contained in these first 100 points is complex valued containing both phase and amplitude information. The corresponding amplitude data after the windowing operation is depicted in FIG. 10 where the window is multiplied with the data acquired from the two reflections resulting in a complex data set only from the first reflection peak. This windowed complex data set is Fourier transformed in order to extract the phase distortion in the spectral domain. This phase distortion describes the non-linearity associated with phase response from the original ideal, single reflection at point A and is depicted in FIG. 11.

Figure 12:
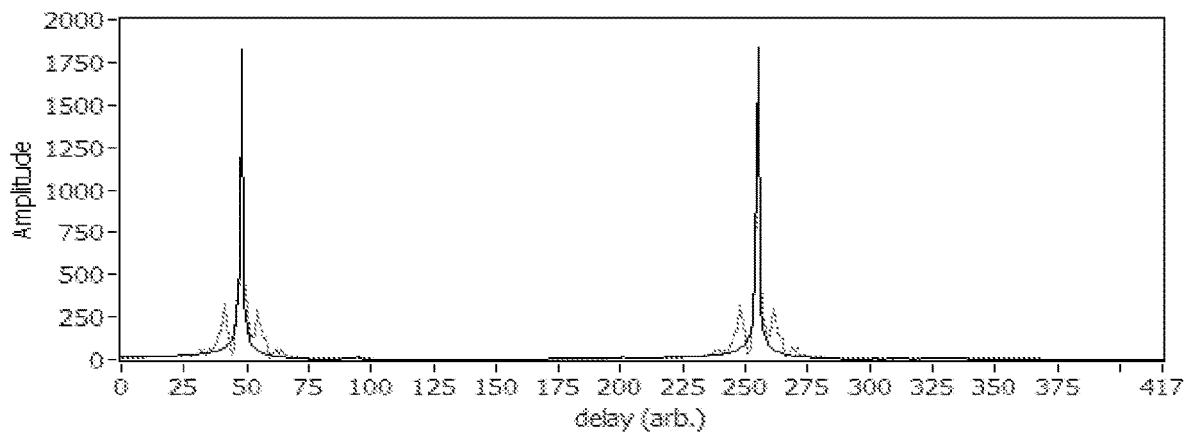
FIG. 12 is a diagram that plots in gray the original distorted reflection peaks in the delay domain and in black the peaks after the data has been corrected using the phase correction.

This phase distortion is then used as a phase distortion correction which may be applied to the entire acquired data set by subtracting this phase distortion from the measured phase for the entire acquired data set to recover clean peaks at both locations in the delay domain. This is shown in FIG. 12 where the gray lines shows the original distorted reflection peaks in the delay domain and the black line shows the peaks after the data has been corrected using the phase correction calculated from the peak at index 50. Both peaks are now sharp.

Figure 13:
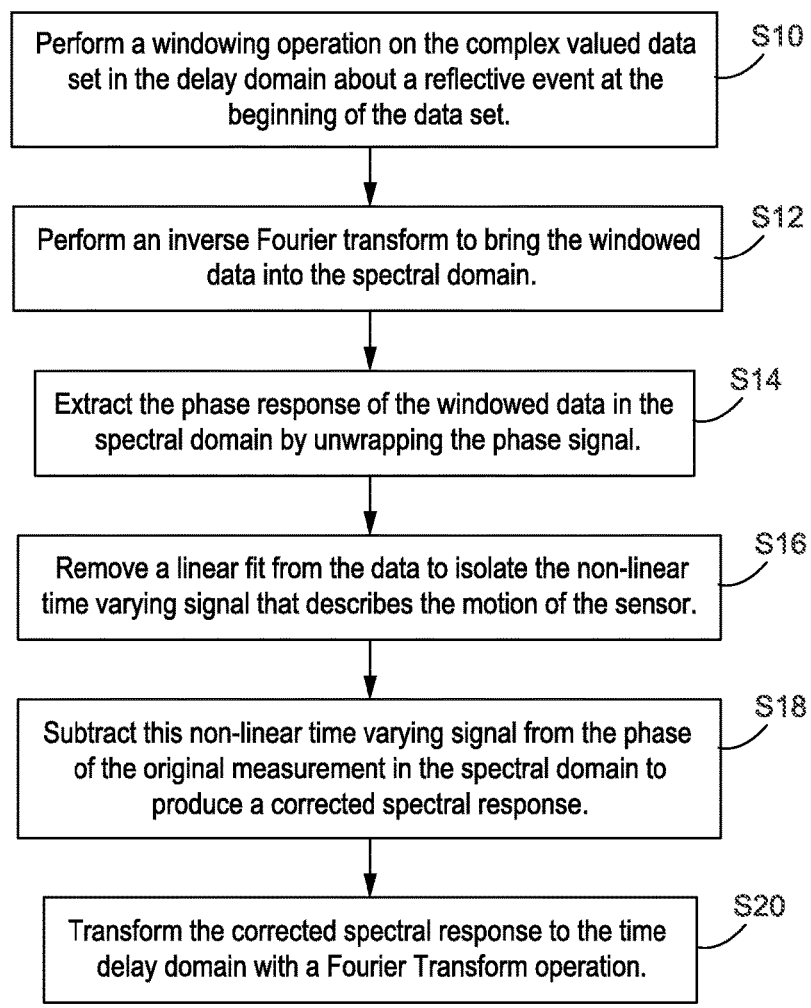
FIG. 13 is a flowchart diagram of non-limiting, example procedures for extracting and subsequently correcting for a time varying signal in an OFDR measurement.

A flowchart outlining non-limiting, example steps to extract the time varying signal as a result of motion and the subsequent correction of the data is shown in FIG. 13. Starting at step S10, a windowing operation is performed on a complex valued OFDR data set in the time delay domain about a reflective event, e.g., at the beginning of the data set. An inverse Fourier transform is applied to transform the data set into the frequency domain (step S12). The phase response in the spectral domain is extracted by unwrapping the phase signal (step S14). The total accumulated phase is proportional to the location of the reflective event in the delay domain. Each index of delay in the delay domain accumulates a two Pi phase change in the spectral domain, e.g., a reflective event at index 500 will have a total accumulated phase response in the spectral domain of 1000 Pi after unwrapping. Subtracting a linear fit from this accumulated phase response removes the phase associated with the location of the reflective event in the delay domain providing a measure of the non-linear time varying signal that describes the motion of the sensor (step S16). The non-linear time varying signal is a compensating signal, which for example, is subtracted from the phase of the original measurement OFDR data set in the spectral domain (step S18). The motion-compensated spectral response is then transformed into the time delay domain using a Fourier transform operation (step S20), which may be used to identify and/or display a clean spectral peak for the reflection.

This example process removes or at least substantially reduces the effects of motion on an OFDR measurement by extracting a time varying signal up to a point in the sensor fiber 10, and then using this signal to compensate the data produced along the length of the sensor 10. This technology compensates for one or multiple movements along the length of the sensor fiber 10 and ensures robustness for a wide range of environments for a deployed sensor in various OFDR applications. Additional non-limiting example embodiments are now described.

A common type of fiber in OFDR sensing applications is industry standard, low bend loss fiber that has a Rayleigh scatter profile. The Rayleigh scatter profile of a given length of sensor fiber appears as a random, broadband signal and results from light scattering off the glass molecules of the fiber itself. This scattering pattern is highly repeatable and may be considered a physical property of a given sensor. Thus, this scattering "fingerprint" is used to obtain a baseline or reference measurement of the fiber.

In the example case of a single reflective event, a linear fit was removed from the phase response in the spectral domain to isolate the non-linear component that captured the effects of motion on the measurement. In a practical system, ideal single reflective events typically do not occur and the spectral responses of neighboring reflective events will mask the desired non-linear component. This can be overcome by comparing a measurement of the fiber to a baseline measurement of the same fiber. The scattering profile of the fiber is highly repeatable, and the comparison of a segment of the measurement in the spectral domain to the corresponding segment of the baseline scan in the spectral domain will allow one to isolate the effects of motion during the measurement. In other words, if no motion is present during a measurement, the comparison of the measurement and baseline in the spectral domain will produce a zero valued phase difference. If motion is present, a non-linear response will be observed.

Three problems must be overcome. First, Rayleigh scatter is a weak signal, and thus, the compensation for motion is susceptible to noise. The inventors developed an averaging methodology to increase the robustness of the motion compensation. Second, deployed sensors are susceptible to many different environmental factors. Robust motion compensation should ensure that changes in the environment, such as temperature changes, do not reduce the effectiveness of the compensation. The inventors developed a way to remove the effects of axial strain from the motion extraction region. Third, there is no guarantee that a deployed sensor only experiences a time varying disturbance before the region of interest in the sensing fiber. Thus, the compensation technology should operate along the length of the sensor to systematically remove various motion affects along the length of the sensor.

The low signal level of Rayleigh scatter problem is solved using an averaging operation for the scatter from multiple adjacent segments in the fiber. In typical applications, it can be assumed that the effects of motion are similar for short lengths of sensing fiber. Choosing small segments of sensing fiber in the delay domain permits the assumption that the adjacent segments will have observed a similar time varying distortion. First, the time varying spectral distortion is extracted from each segment. Fourier transforming both the measurement OFDR data for a segment and the reference/ baseline OFDR data for that same segment to the spectral domain, the complex valued spectral data can be compared to extract a measure of the phase distortion as a result of motion in the measurement segment. This process may be repeated for each adjacent segment, and the average of the spectral distortions calculated. Example steps for such a process are described in the flow chart in FIG. 14.

OFDR scans of the sensing fiber are performed on the sensing fiber 10 in a baseline environment (e.g., no motion, controlled temperature, etc. affecting the fiber) (step S33) to produce OFDR reference data for each of multiple segments of the fiber (step S34) and in an application a baseline environment (e.g., where there may be motion, temperature changes, etc. affecting the fiber) (step S30) to produce OFDR measurement data for each of multiple segments of the fiber (step S31). Segments may be partitioned using for example the windowing technique described above. A Fourier transform operation is performed on the each of the measurement segments (step S32) and on the each of the reference segments (step S35) to transform the segment data into the spectral domain. One example way to perform the Fourier transform is using a fast Fourier transform (FFT). Then, the measurement spectral data for each segment is complex multiplied (the data is complex) with the complex conjugate of the reference spectral data for each corresponding segment (step S36) Mathematically, the multiplication of a complex valued signal with the conjugate of a second signal is equivalent to calculating the difference in the phase values of the complex signals. Due to the noise that distorts this phase measurement, it is desired to average adjacent segments. To average adjacent segments, the real and imaginary components of the complex products from adjacent segments averaged respectively (step S37). The average phase response is extracted by calculating the arc tangent of the real and imaginary parts of the averaged complex product. This phase difference is subsequently unwrapped as described above. This phase response can then be used to compensate for the distortions as a result of motion. As an example, the phase response could be linearly interpolated to match the size of the measurement and subtracted from the spectral domain of the original measurement data to remove the effects of motion.

Although two parallel tracks are shown in steps S30-S32 and S33-S35, these steps need not be performed in parallel, at the same general time, or even one for one. For example, the reference scan steps S33-S35 may be performed in advance and the reference segment data stored in memory for subsequent use with measured segment data. One measurement scan is shown, but it will be appreciated that steps S30-S32 and S36-S39 may be repeated for one or more other measurement scans.

Figure 14:
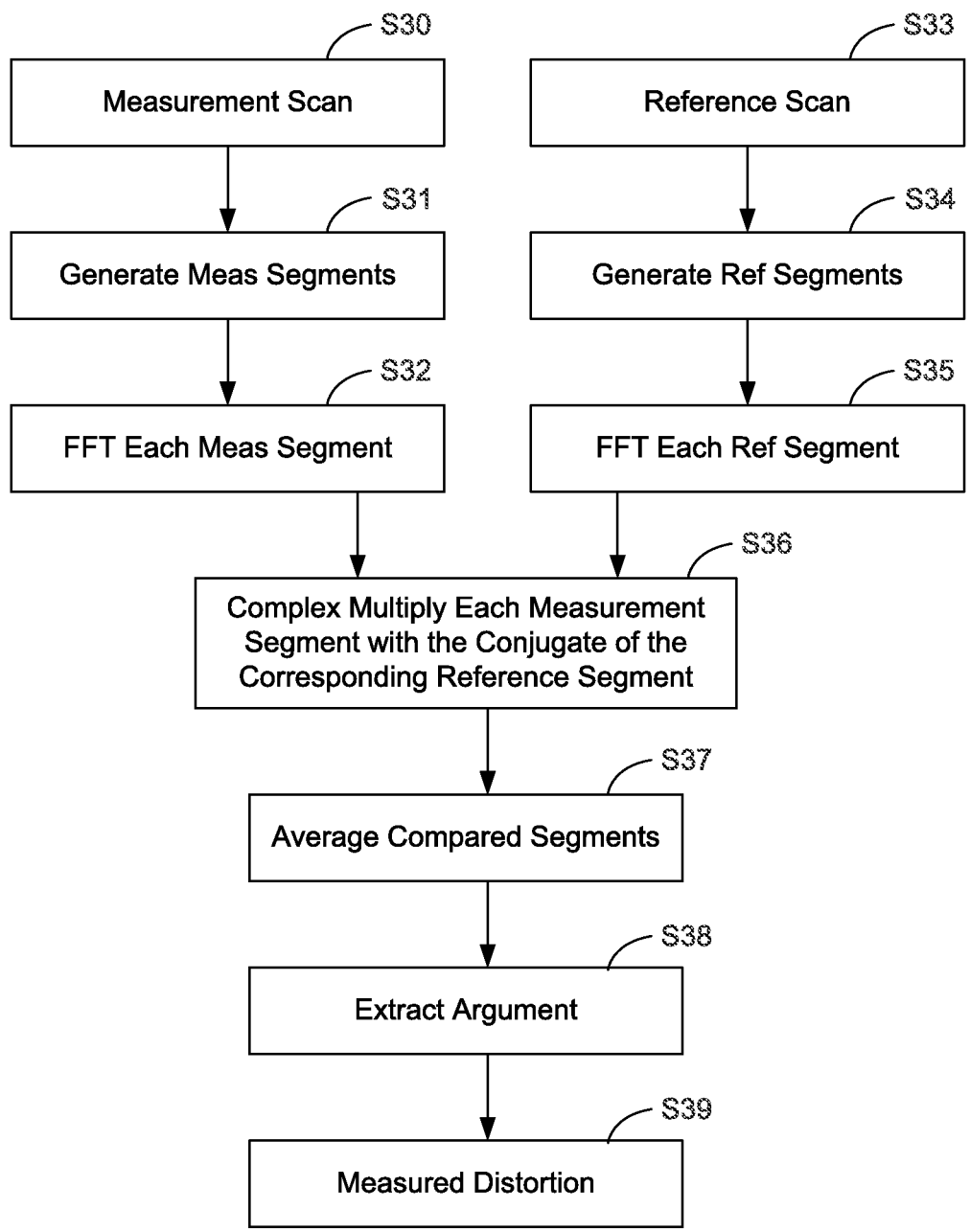
FIG. 14 is a flowchart diagram of non-limiting, example procedures for extracting and averaging a time varying phase response in the spectral domain between a reference OFDR data set and measurement OFDR data set.

The processing flow for the calculation of the motion compensation shown in FIG. 14 is now described mathematically. Let $K_p$ be the array of complex scatter measurements in a length of uniformly strained fiber, where p indicates the position along the array in delay. A set of sub-arrays is produced by transforming successive segments of $K_p$ back into the spectral domain. $K_{kn}$ represents the spectrum of measurement segment n and k is the spectral index:

$$K_{kn} = FFT\{K_{nS} \ldots K_{(n+1)S}\},$$

where S is the length in number of points of the segment. The process is repeated using the reference measurement, $N_p$, $$N_{kn} = FFT\{N_{nS} \ldots N_{(n+1)S}\}$$

The signal that captures the effects of motion is then given by, $$v_k = L \sum_n N_{kn}^* K_{kn} = L \sum_n FFT\{\eta_{nS} \ldots \eta_{(n+1)S}\}^* \cdot FFT\{\kappa_{nS} \ldots \kappa_{(n+1)S}\}$$

Figure 15:
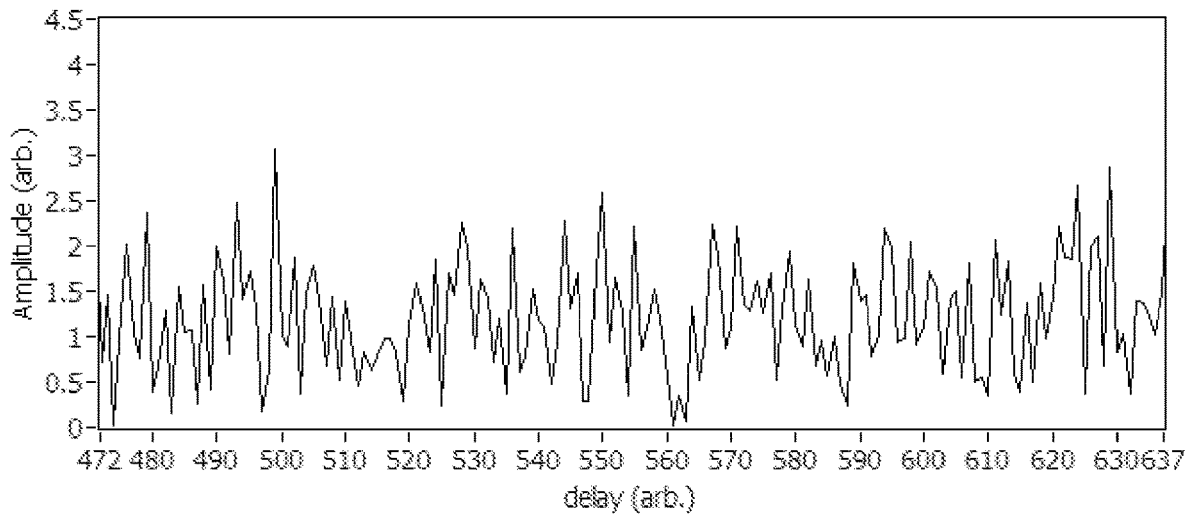
FIG. 15 illustrates an example plot of a simulated scatter amplitude vs. delay.
Figure 16:
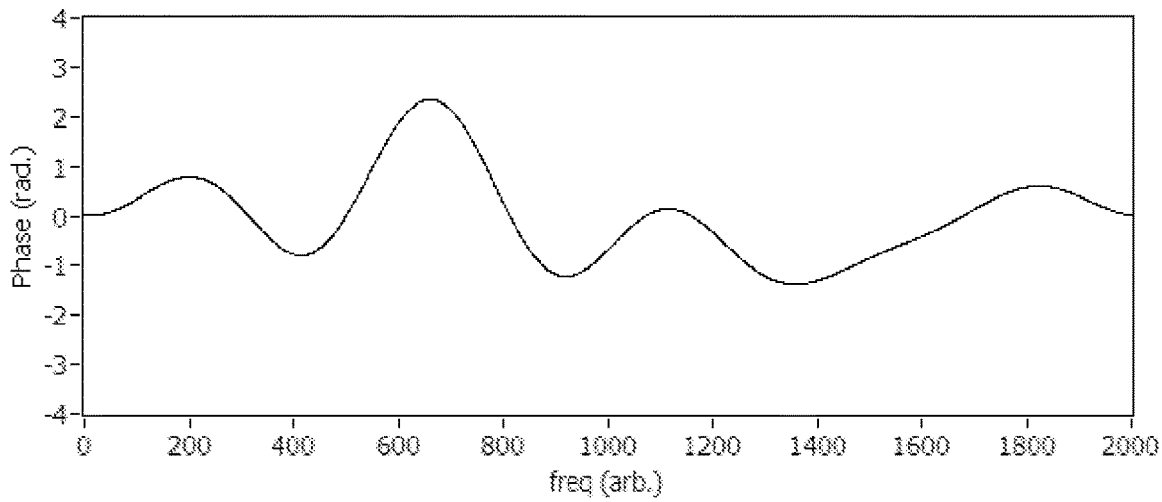
FIG. 16 illustrates a plot of an example phase distortion to be applied to the scatter data.
Figure 17:
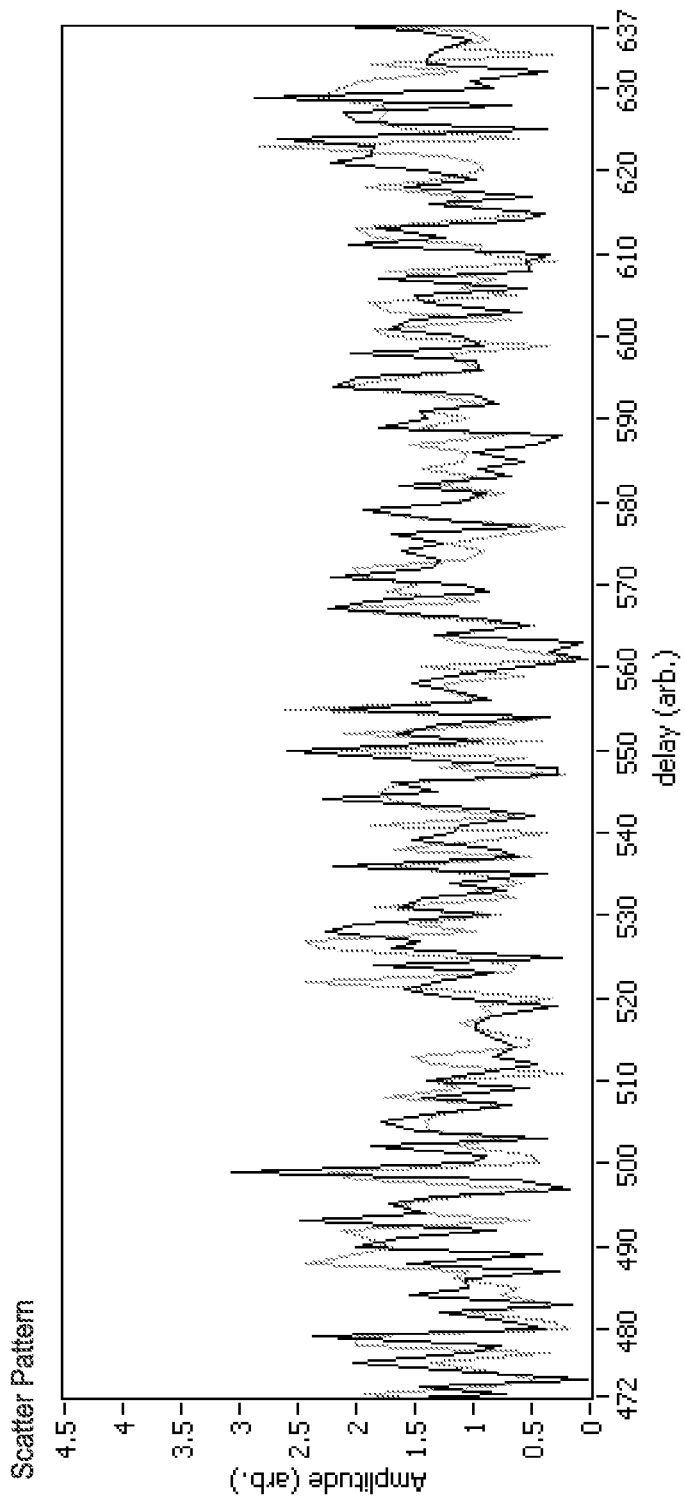
FIG. 17 is a graph showing as a black trace the original scatter amplitude vs. delay of the scatter pattern and as a gray trace the scatter amplitude after having been distorted in the frequency domain by the phase distortion from FIG. 16.

An example of the above is now described using synthesized data. An arbitrary scatter pattern is generated as shown in FIG. 15 which plots simulated scatter amplitude vs. delay. Next, FIG. 16 shows an example phase distortion (a motion error that is low in frequency content) to be applied to the scatter data. This phase disturbance is applied to the spectrum of the scatter data by first transforming the complex scatter data into the spectral domain and then multiplying transformed scatter data by a complex array that has the phase disturbance as its argument and an amplitude of one. The resulting scatter pattern is significantly altered as shown in FIG. 17. The black trace shows the original scatter amplitude vs. delay, and the gray trace shows the scatter amplitude after having been distorted in the frequency domain.

Figure 18:
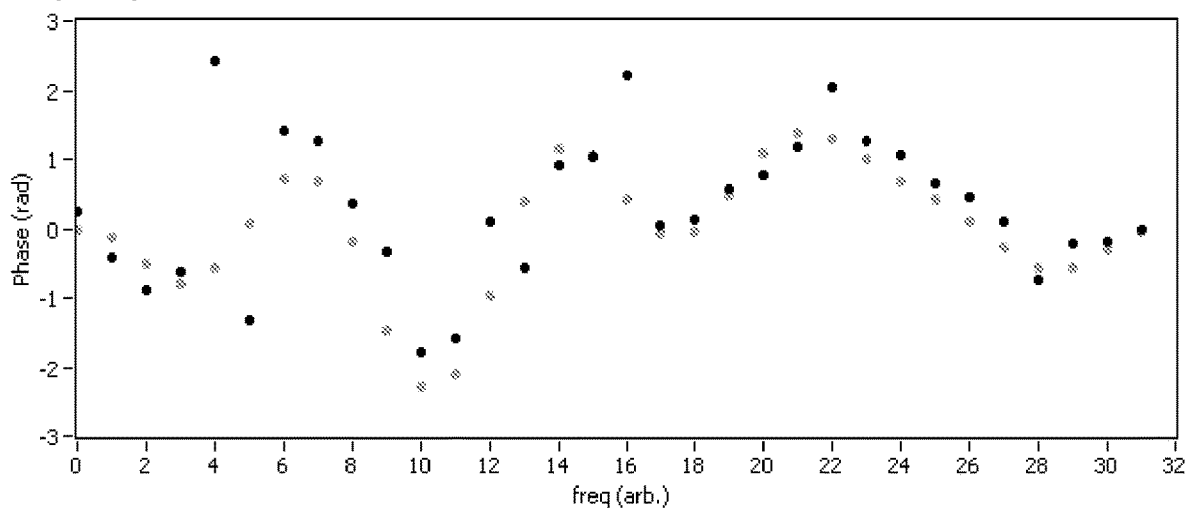
FIG. 18 is a plot of spectral phase distortion calculated from a single delay domain segment of the scatter pattern.

In order to extract the effects of motion, eight (8) segments of thirty-two (32) points, or 256 points total, are transformed from the delay domain and into the spectral domain. This segmenting and transforming is performed on both the altered data serving as the measured data set and the reference data set. FIG. 18 plots the spectral phase distortion calculated from a single delay domain segment of the scatter pattern shown. The gray dots represent the phase distortion applied to this segment. The black dots represent the phase distortion as calculated comparing the distorted segment data to the reference data. One can see frequencies at which the calculated phase distortion does not match the applied phase distortion. For example, the phase distortion for index 4 is significant.

Figure 19:
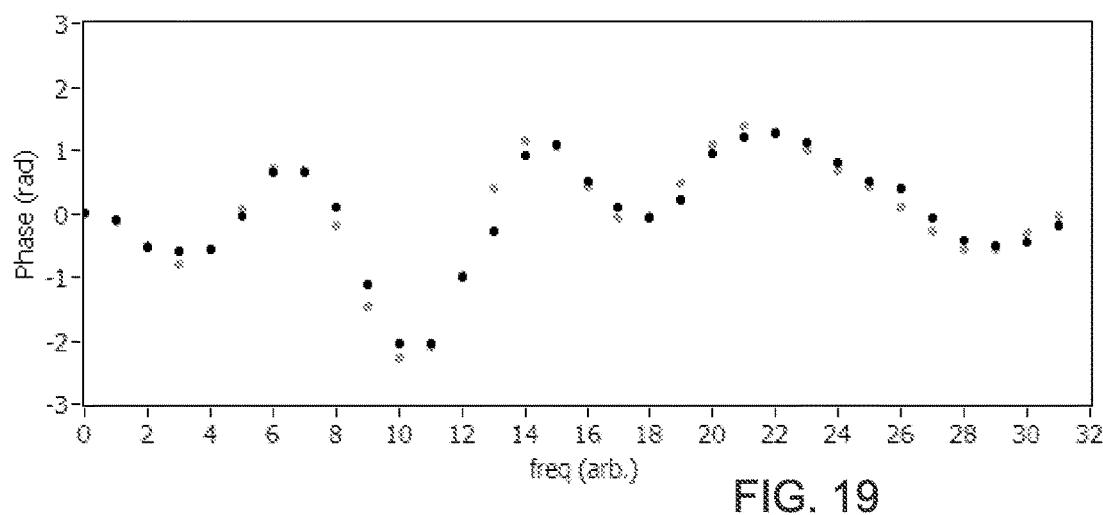
FIG. 19 is a plot of phase distortion vs. frequency calculated by averaging complex data from each segment in the spectral domain compared with applied phase distortion (gray).

However, when the relative complex spectra are averaged, the influence of each individual phase value may be effectively weighted by the size of the amplitude at that location. FIG. 19 plots phase distortion vs. frequency calculated (black) by averaging the relative complex data from each segment in the spectral domain compared with applied phase distortion (gray). The averaging provides a much more accurate measurement of the phase as can be seen by comparing FIG. 18 with FIG. 19.

Averaging over adjacent segments provides a good estimate of the error signal caused by fiber motion present in the measurement data. The next step is to apply the inverse of this phase to the entire scatter measurement data to compensate the measurement data, and then invert the compensated measurement scatter data back into the delay domain. Before doing this, a signal is generated having the same size as the original measurement data set (in this case a size of 2048 points) rather than the length of the segment being analyzed. This can be performed, for example, by mathematically interpolating the calculated error signal to match the size of the measurement using a Fourier Interpolation. A Fourier Interpolation is a standard mathematical means of interpolating a signal of a given array size to a desired array size. Briefly, a Fourier Interpolation is performed by first taking the Fourier Transform of a real valued signal. In the transform domain, the data is zero padded by placing zeros in the center of the data array until the array is the size of the desired interpolated array size. An inverse Fourier transform is then performed on the zero padded data. The real component of this complex signal will be a scaled interpolation of the original real valued signal. The amplitude of this signal is then scaled by the ratio of the interpolated array size to the size of the original real valued array.

Figure 20:
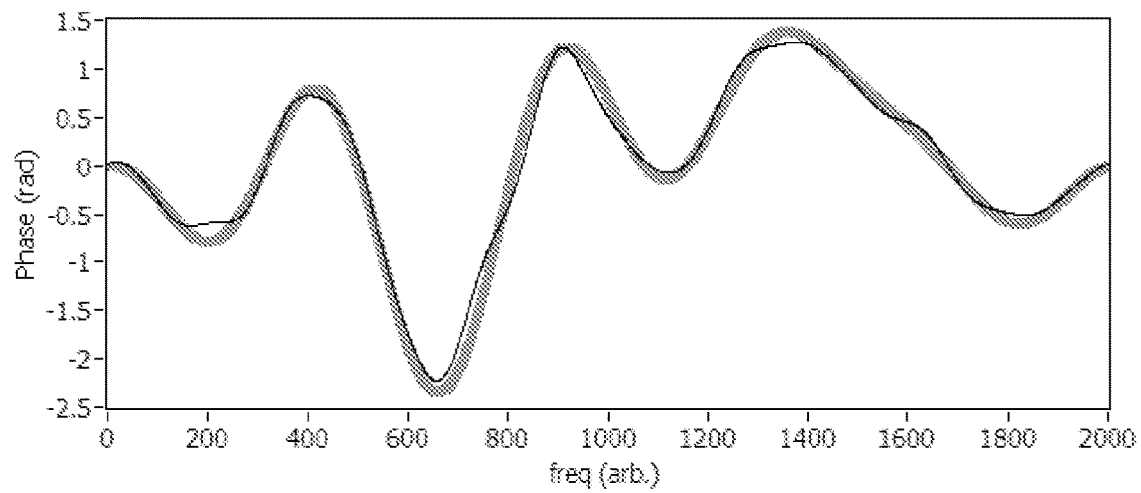
FIG. 20 contrasts an interpolated calculated phase distortion with the original applied phase distortion.

Once we have interpolated the phase estimate, it can be compared to the originally applied phase disturbance, shown in gray in FIG. 20 with the phase estimate in the thin black line. The gray is the original applied phase distortion. The two match relatively well.

Figure 21:
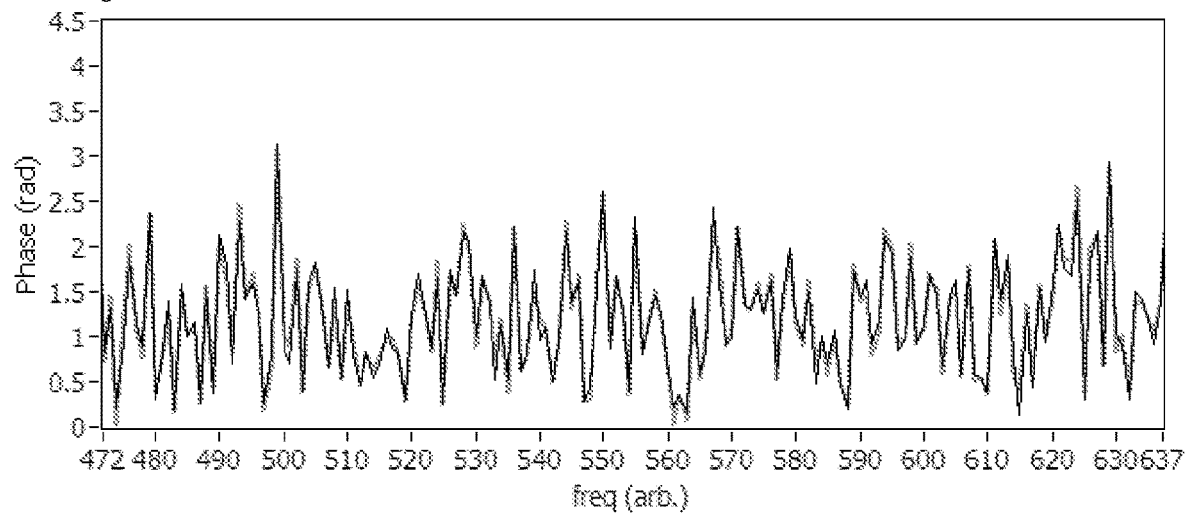
FIG. 21 shows the amplitude of the original scatter pattern and the corrected scatter pattern.

Applying this interpolated phase estimate to the scatter spectrum and recalculating the scatter as a function of distance recovers the original signal. This is shown in FIG. 21 where the black trace is the amplitude of the original scatter pattern generated and the grey trace is the amplitude of the corrected scatter pattern calculated as described above.

Figure 22:
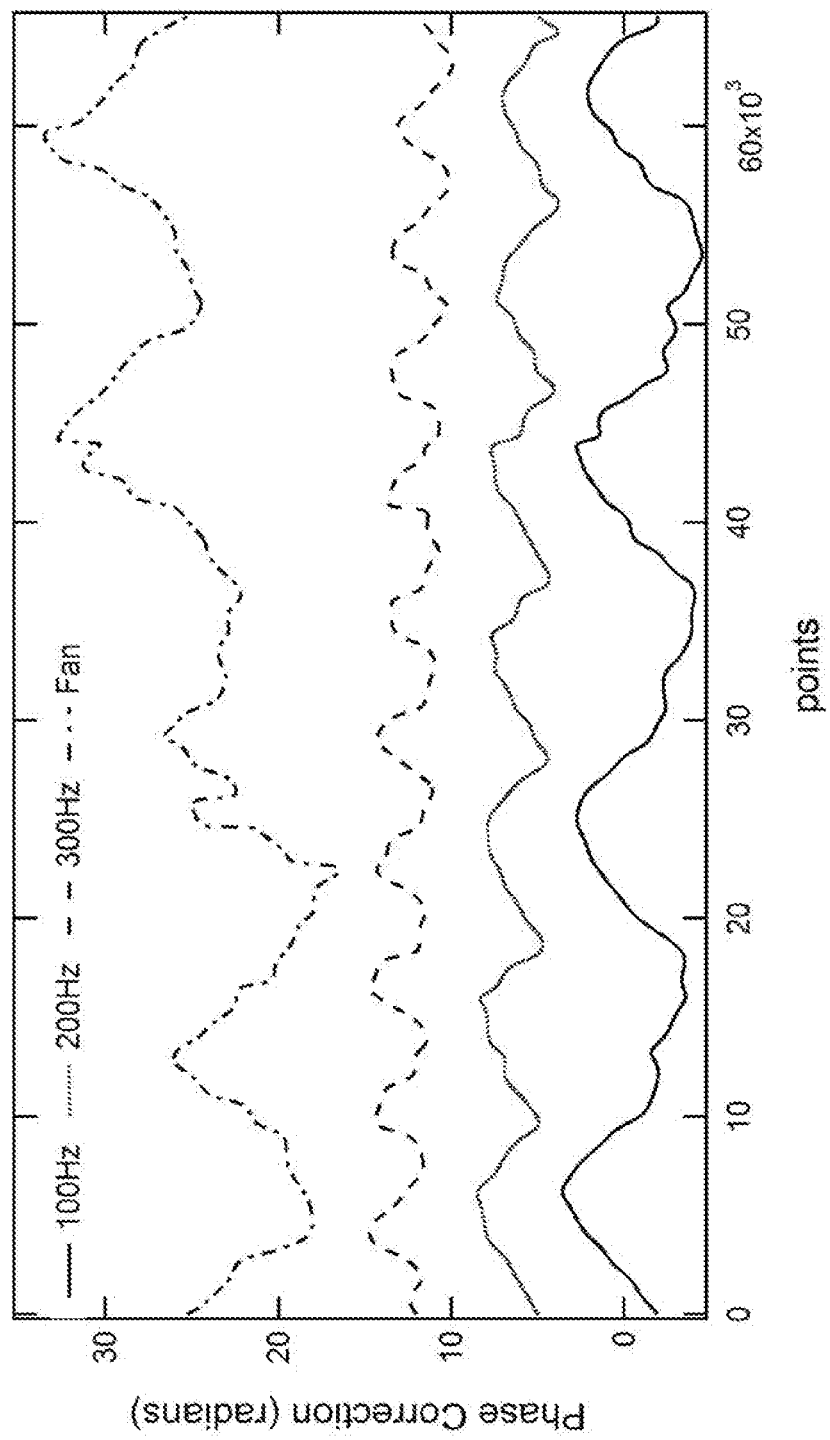
FIG. 22 plots phase distortion vs. optical frequency for four different vibrations applied to a fiber lead.
Figure 23:
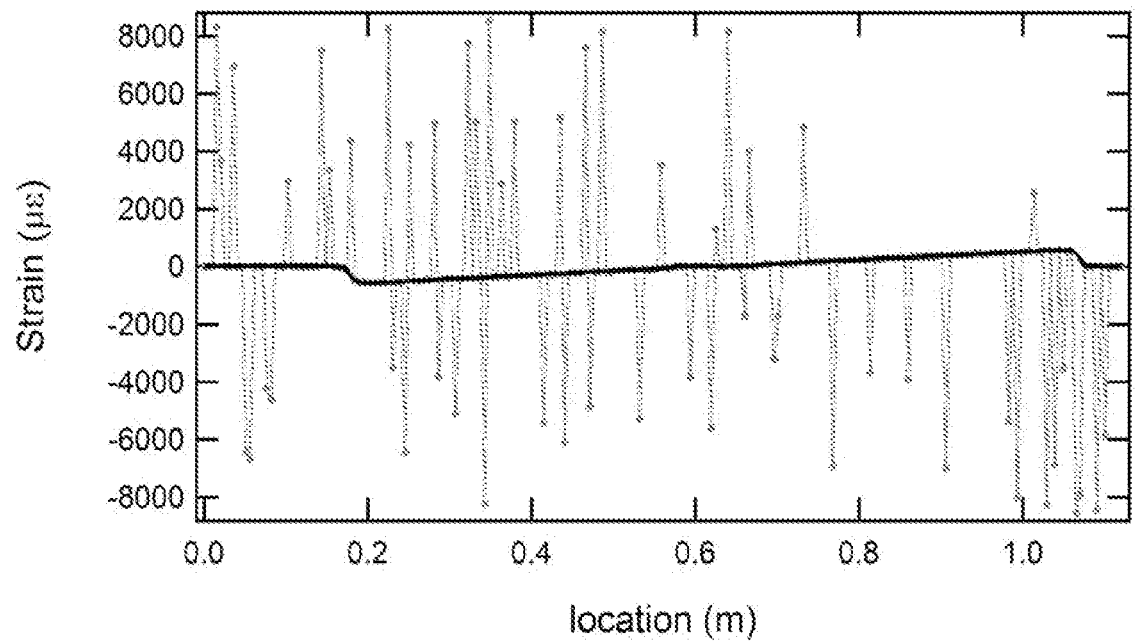
FIG. 23 plots the strain calculated along sensing fiber after vibrating the fiber at 300 Hz with and without vibration correction.

The example synthesized data embodiment described and illustrated above was implemented in an OFDR system that was then used to detect strain in the sensing fiber beyond the motion compensation region. FIG. 22 plots the phase distortion vs. optical frequency calculated as described above for four different vibrations applied to a fiber lead. The first three were generated with a speaker at 100, 200, and 300 Hz. In the fourth, the lead was draped over an electric fan to generate a representative environmental perturbation. In the first three, the increasing vibration frequency is clearly distinguishable. If these vibrations are not compensated, the determination of strain is not accurate as shown by the gray trace in FIG. 23. With the phase distortion corrections applied, however, the errors do not occur, as shown by the black trace in FIG. 23. The trace in FIG. 23 includes strain data taken with the 300 Hz vibration present with and without phase distortion corrections.

Figure 24:
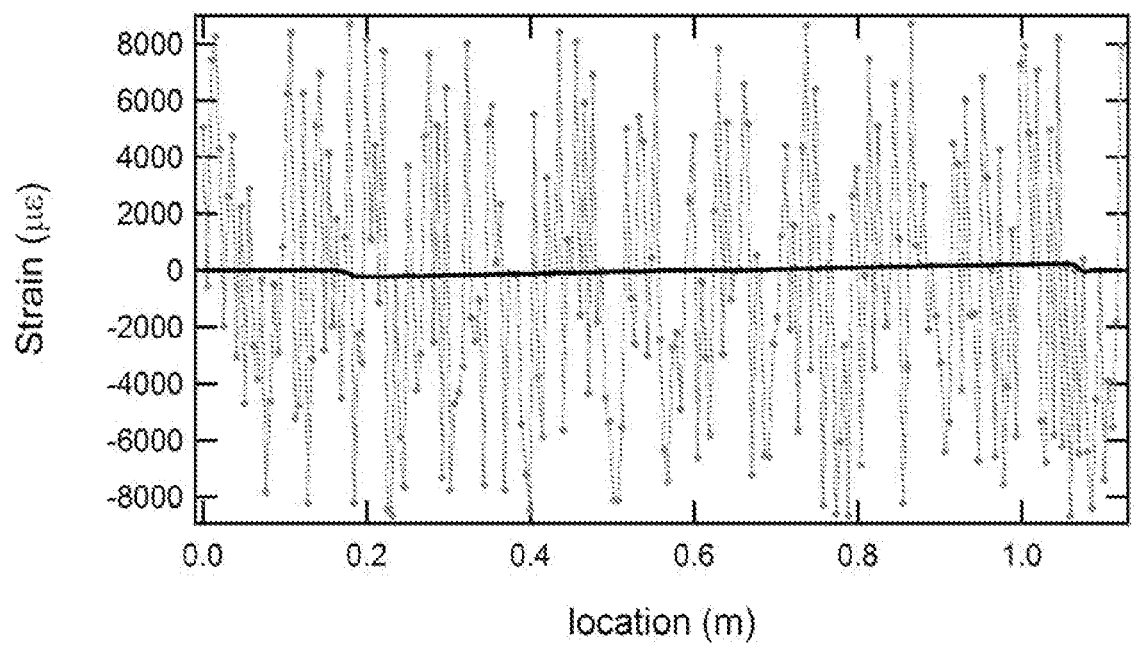
FIG. 24 plots the strain calculated along the sensing fiber with the fiber draped over an electric fan.

FIG. 24 plots the strain calculated along the sensing fiber with the lead draped over the electric fan. Even though this disturbance to the sensor is more severe, (see the uncorrected gray data with many failed strain calculations), the correction is still effective as shown by the black trace.

Other aspects of the technology relates to robustness. The inventors developed a way for the phase distortion compensation described above to work successfully in different environments. If there is a strain present in the optical fiber length used for vibration calculation, the effect is an accumulation of a phase difference between segments in the spectral domain. This phase difference modifies the response in the spectral domain, making it difficult to extract an averaged response that captures the effects of motion. In this case, the inventors determined that it is desirable to "align" the segments in the spectral domain.

The example synthesized data embodiment above permitted adding the complex segments together because, with no strain present, they each had the same phase relative to the reference data set. An estimate of the phase change between segments in the spectral domain may be calculated by first multiplying each segment by the conjugate of the previous segment. Note, this is a comparison of the phase response between each segment in the average series, and is not referenced to the baseline scan of the fiber. Thus, any distortion due to vibration will be minimized as each measurement segment is similar to the next segment. If there are 10 segments, then there will be 9 product segments. The phase of each of the elements of the product is the average change in phase between segments, which is a measurement of the strain. Since every element contains the same phase (plus some noise), all of the elements may be summed, and the phase of this complex sum will be the average phase increment between segments. So in the example of 10 segments that are 32 elements in length, 288 complex numbers are summed to obtain the average phase increment between segments.

Returning to the original analysis where $K_p$ is the array of complex scatter measurements in the length of uniformly strained fiber, a set of sub-arrays is constructed by transforming successive segments of $K_p$ back into the spectral domain (k)

$$K_{kn} = FFT\{K_{nS} \ldots K_{(n+1)S}\},$$

where S is the length in number of points of the segment. The process is repeated using the reference measurement, $N_p$, $$N_{kn} = FFT\{N_{nS} \ldots N_{(n+1)S}\}$$

The average phase difference between successive segments, δ, is calculated, where, $$\delta = \angle \sum_n \sum_k (N^*_{k(n+1)} K_{k(n+1)})(N_{kn} K^*_{kn})$$

The correction may then be applied to the calculation of the vibration by applying linearly increasing phase shifts to each segment.

$$v_k = \angle \sum_n e^{-i\delta n} N^*_{kn} K_{kn}$$

Alternately, the strain can be applied to the original complex arrays prior to the calculations of the spectral segments.

$$N'_{kn} = FFT\left\{e^{i\frac{\delta}{S}nS}\eta_{nS} \ldots e^{i\frac{\delta}{S}p}\eta_p \ldots e^{i\frac{\delta}{S}(n+1)S}\eta_{(n+1)S}\right\}$$

This advantageously introduces any significant spectral shift to the transform data prior to the spectral computations. The vibration is calculated as before using the modified reference in this instance.

$$v_k = \angle \sum_n N'^*_{kn} K_{kn} = \angle \sum_n FFT\{\eta_{nS} \ldots \eta_{(n+1)S}\}^* \cdot FFT\{\kappa_{nS} \ldots \kappa_{(n+1)S}\}$$

Figure 25:
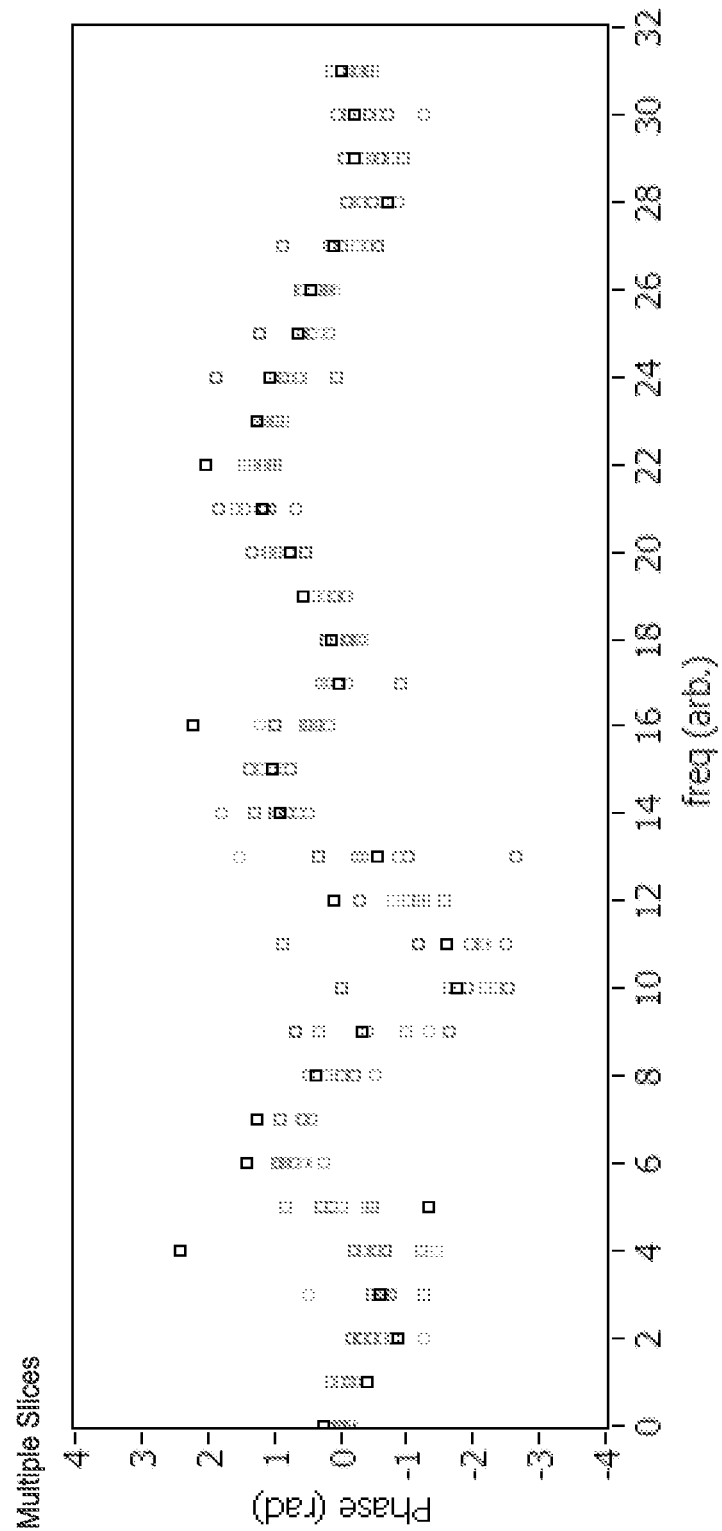
FIG. 25 plots distortion calculated for multiple slices as a function of wavelength for an unstrained length of fiber.

To illustrate this concept, consider the previous example that operated on simulated Rayleigh scatter data. FIG. 25 plots phase distortion calculated for multiple segments as a function of wavelength for an unstrained length of fiber. The phase difference calculated for each of the segments under the condition of zero strain provides a tight grouping of phase curves, and the complex numbers may be averaged directly to get the average phase at every point. In other words, averaging the complex values for an unstrained fiber subjected to movement produces a good representation of the original phase error. Now, strain is added to the original computational model by adding a linear phase term to the original scatter data.

Figure 26:
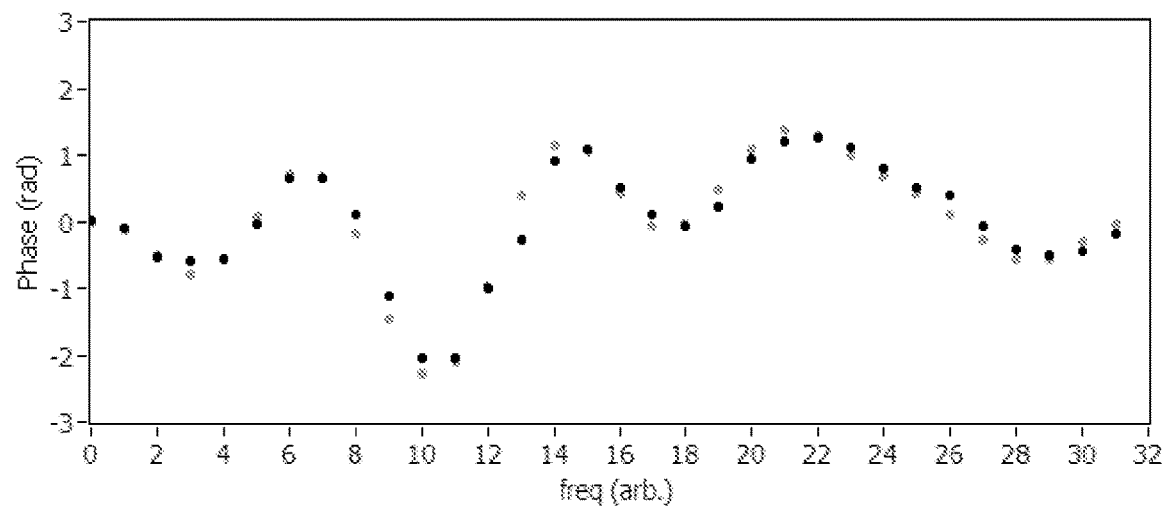
FIG. 26 shows the phase distortion calculated by averaging the data shown in FIG. 30 as compared with the originally applied phase distortion.
Figure 27:
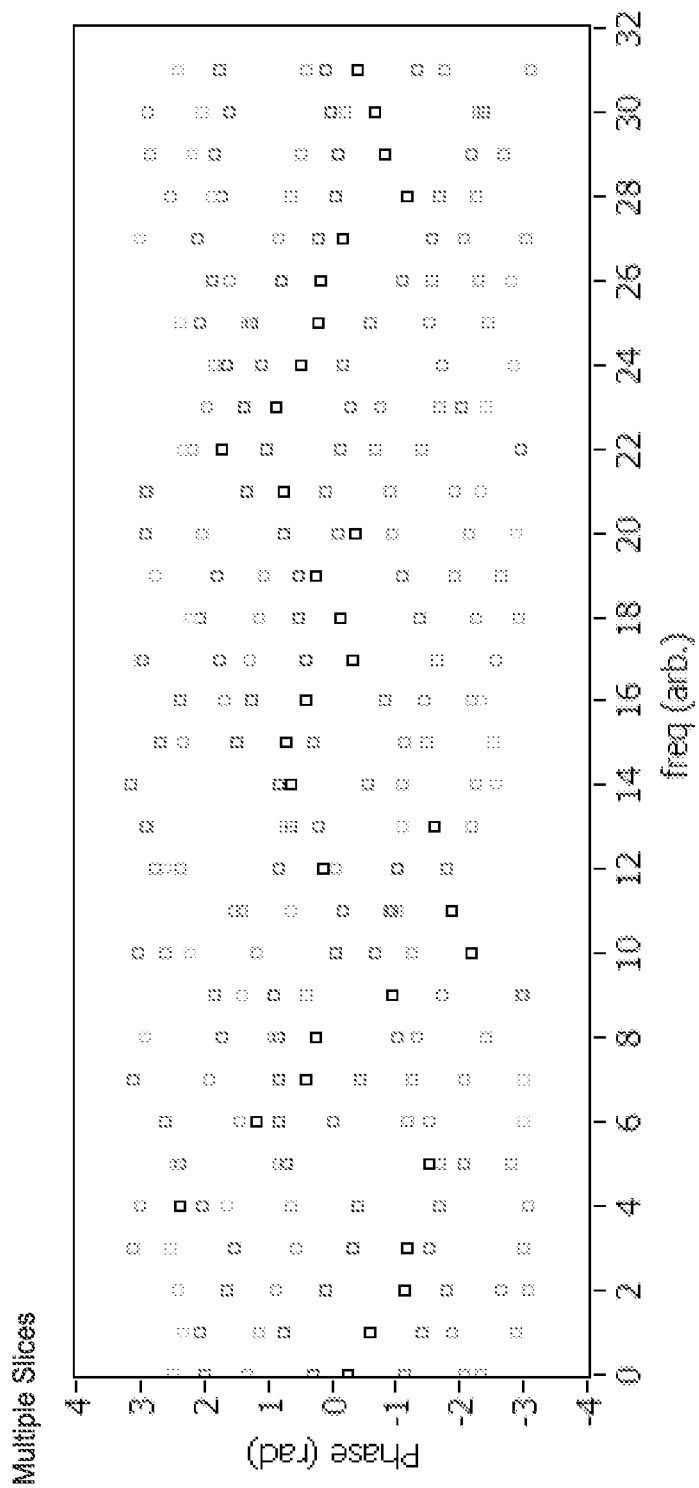
FIG. 27 shows phase distortion calculated for multiple slices as a function of wavelength for a strained length of fiber.

FIG. 26 plots phase distortion calculated by averaging the data shown in black against the originally applied phase distortion shown in gray. After introducing a strain to the fiber, the spectral responses of the segments are no longer tightly bunched as shown in FIG. 27 which plots phase distortion calculated for multiple segments as a function of wavelength for a strained length of fiber. In other words, the phase response at each frequency no longer match for each segment so a simple average no longer works to recover the vibration signal as the population of points has too much variation. As a result, this signal will not average to the phase distortion observed in FIG. 26. Accordingly, there needs to be a correction for the strain.

Figure 28:
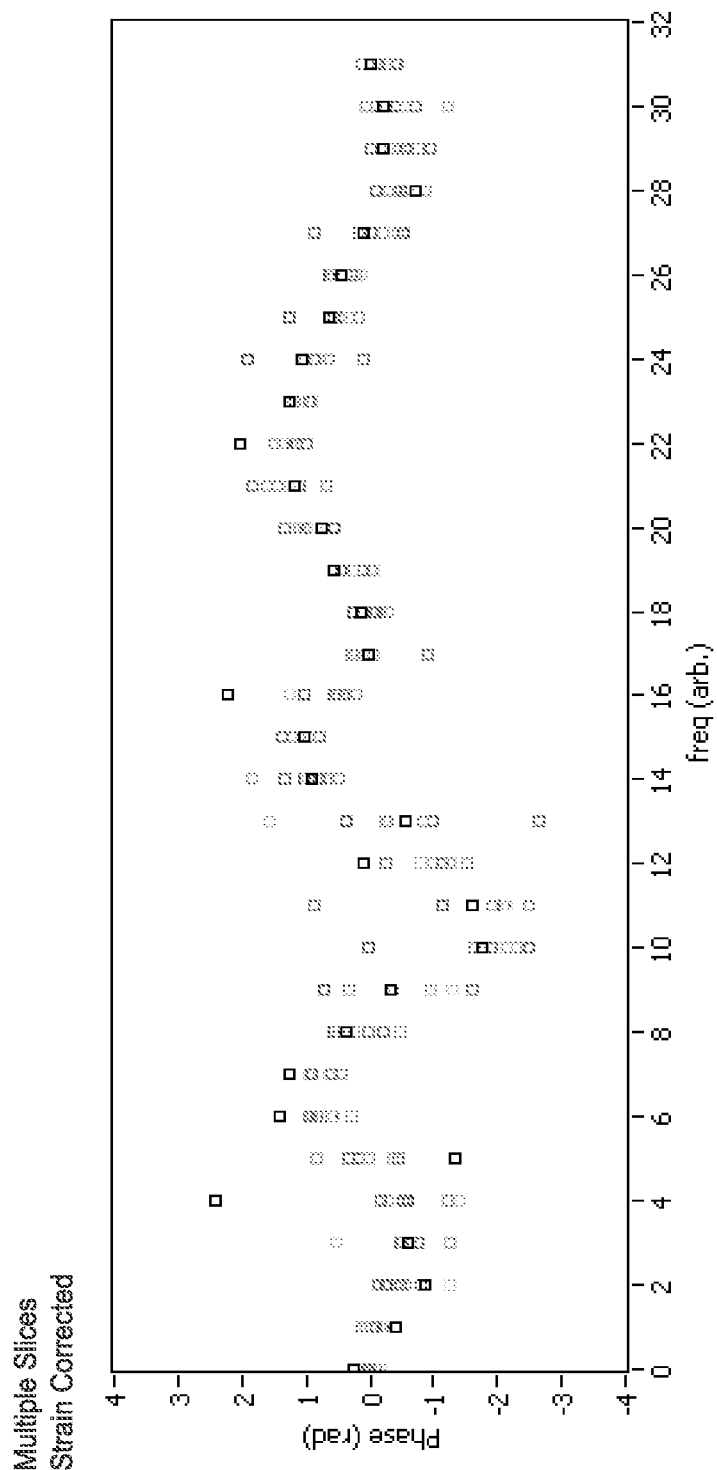
FIG. 28 shows phase distortion calculated for multiple slices as a function of wavelength for a strained length of fiber, where each segment has been corrected for the applied strain.

A strain applied to the sensor will manifest as a shift in the spectral domain and also as a change in the phase slope in the temporal domain when compared to a baseline scan in an OFDR measurement. Generating a strain correction from the average difference in phase between the measurement segments in the spectral domain gives a measure the phase slope applied in the temporal domain. With this measure of strain, an opposite phase slope is applied across the segments in the temporal domain to realign the responses of the segments in the spectral domain as seen in FIG. 28, where each segment has been corrected for the applied strain. The data once again match.

Figure 29:
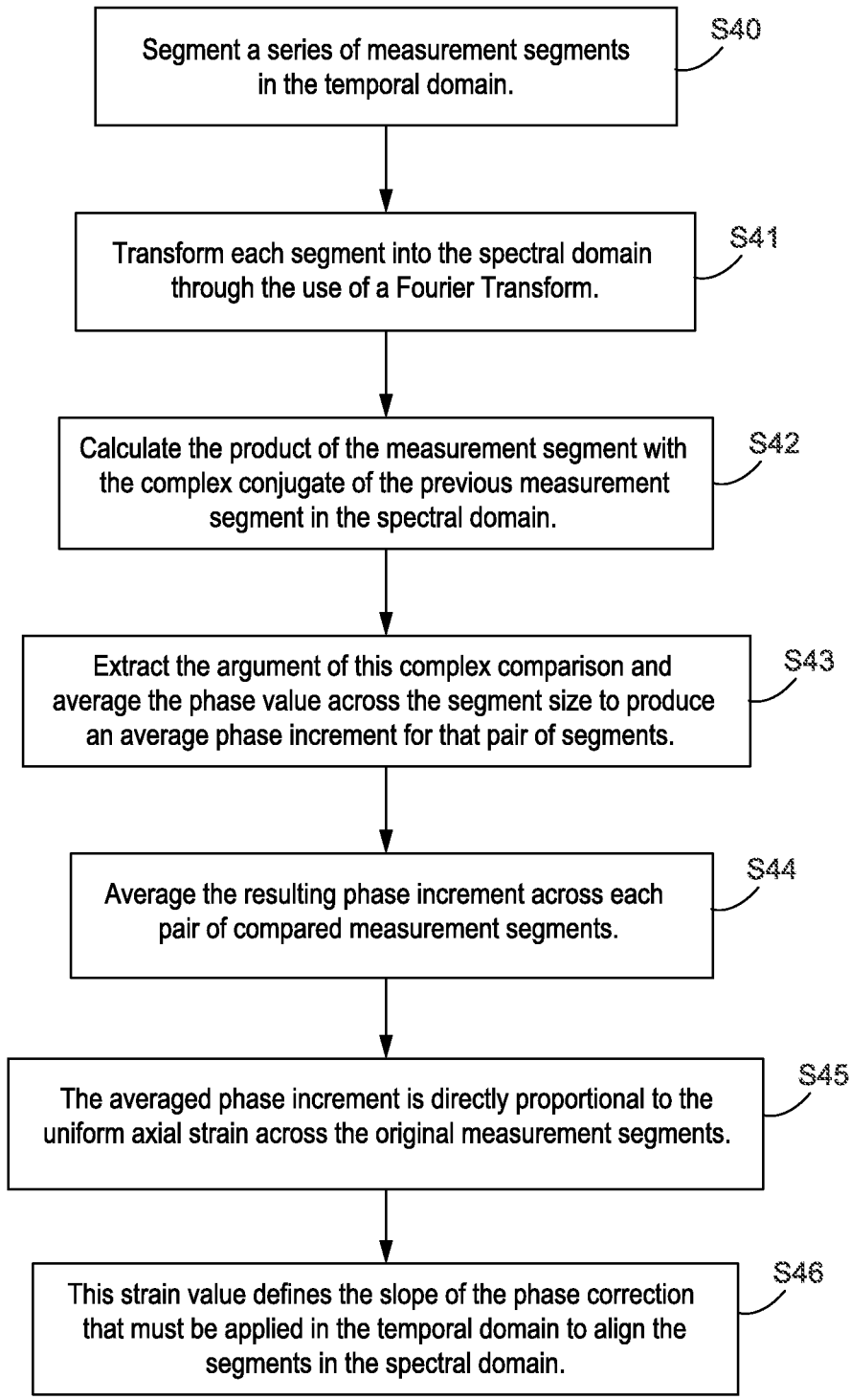
FIG. 29 is a flow chart showing example steps to remove effects of a uniform axial strain across the segments used to extract a motion correction signal.

Example procedures removing or at least reducing the effects of a uniform axial strain across the segments to extract a motion compensation signal are outlined in the flow chart in FIG. 29. OFDR measurement data in the temporal domain for each of a series of fiber measurement segments are defined (steps S40). Each segment data set is Fourier transformed into the spectral domain (step S41). A spectral domain product of the measurement segment data set and the complex conjugate of an adjacent measurement segment data set is calculated (step S42). The argument of the complex comparison is defined as the arctangent of the ratio of the imaginary and real values of a complex number. The resulting argument is then averaged across the number of points within the segment in order to produce an average phase increment for that pair of segments (step S43). The average change in phase between a pair of segments is referred to as the phase increment. The resulting phase increments across each pair of compared measurement segments are averaged (step S44). The averaged phase increment is directly proportional to the uniform axial strain across the original measurement segments and the average phase increment is scaled to a measure of strain (step S45). This strain value defines the slope of the phase correction to be applied in the temporal domain to align segments in the spectral domain. A correction is applied in the temporal domain by multiplying the data with a generated complex correction with the phase slope based on the measured strain and with an amplitude of one (step S46).

Figure 30:
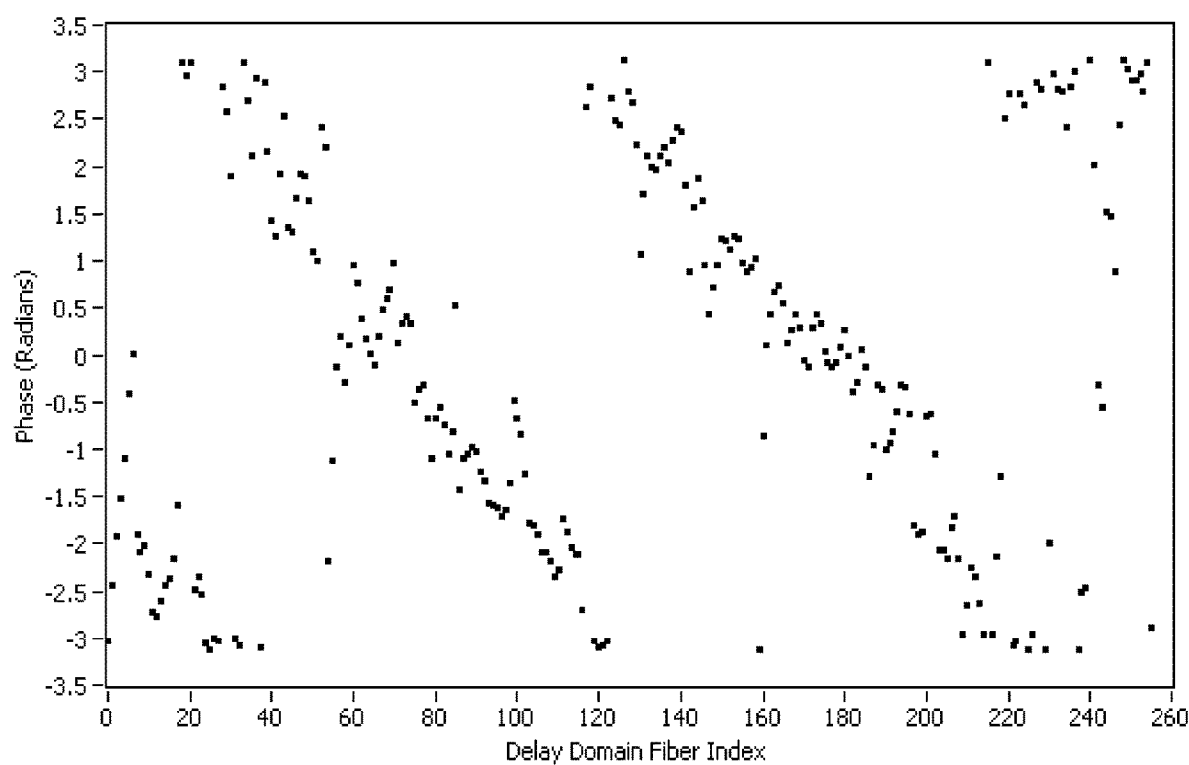
FIG. 30 is a graph of phase v. delay showing how an extracted argument of a complex multiply between a reference and measurement in the delay domain provides a measure of change in optical delay as a result of strain being applied to the measurement.
Figure 31:
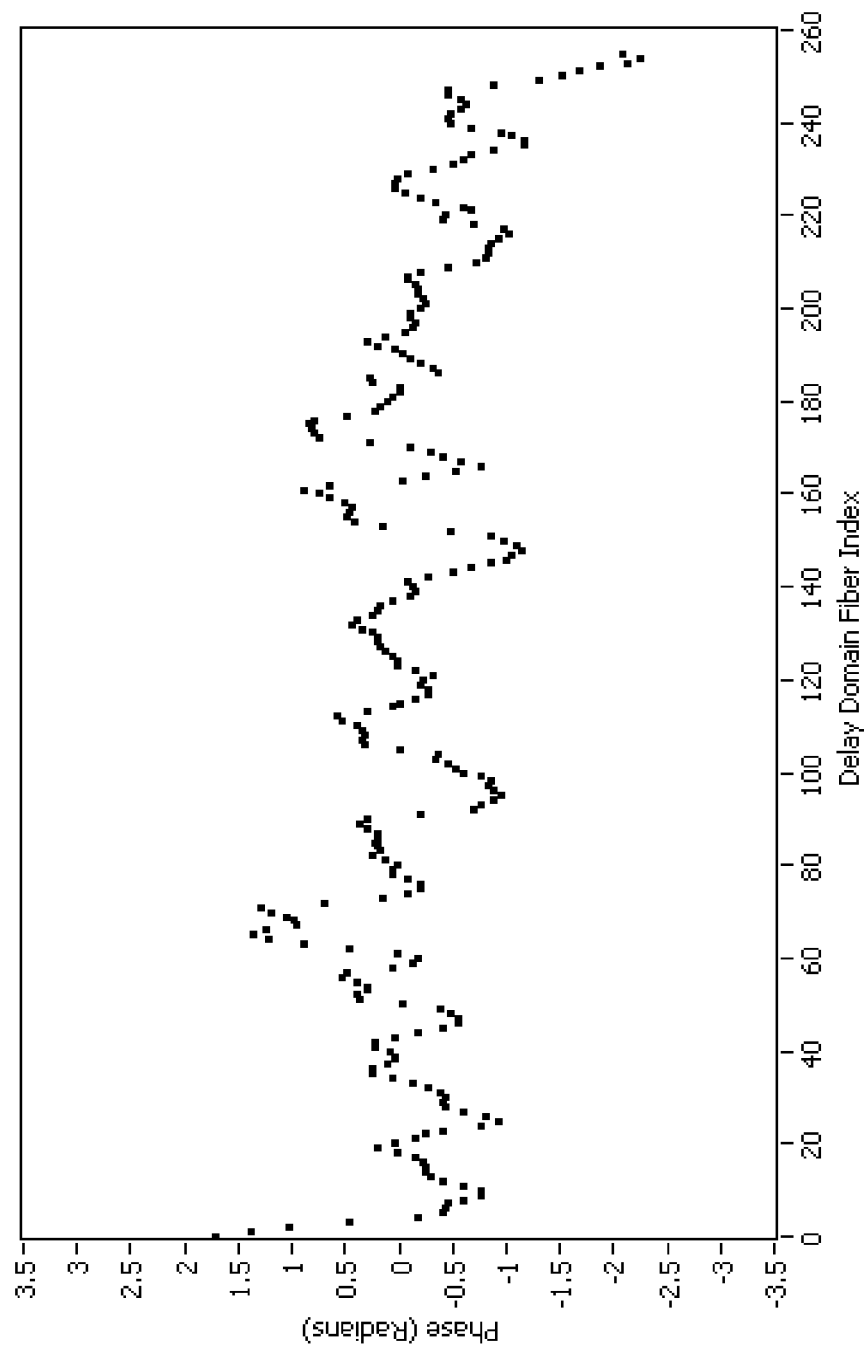
FIG. 31 is a graph of phase v. delay showing the optical delay response extracted from the argument of a complex multiplication between a reference and corrected measurement.

An example optical phase response as result of strained measurement is presented in FIG. 30 which shows that the slope of the optical phase response extracted between a measurement and reference length of fiber in the delay domain has a slope. Using the method in FIG. 29, a measure of this slope is extracted by comparing the difference between the measurement segments in the spectral domain. To remove the strain from the measurement, a phase response opposite in slope is applied across the measurement length. If the reference and measurement are once again compared by extracting the argument of their product in the temporal domain, a zero slope optical delay response is observed. FIG. 31 shows the optical delay response extracted from the argument of a complex multiplication between a reference and corrected measurement. After this compensation for strain in the temporal domain, the responses in the spectral domain are generally aligned and can be averaged to gain a more accurate measure of the distortion as a result of motion.

It has been shown that a length of fiber can be selected in order to extract the spectral distortion as a result of motion experienced by the sensor up to that location. This calculation may be made more robust by dividing that length of fiber into smaller segments and averaging the spectral distortion across those segments. In the presence of a uniform axial strain on the fiber, this strain can be measured and removed by comparing the responses of the measurement segments in the spectral domain. Another aspect of the technology relates to ensuring robustness over a wide range of applications.

So far, it is assumed that the reference segments and the measurement segments are aligned in temporal delay. If axial strain is present in the sensor leading up to the location that a motion distortion is desired to be measured, then the measured sensor may have an overall change in length. As a result, some mechanism is needed to ensure that the OFDR measurement data for a physical segment of the fiber is compared to the OFDR reference or baseline data for the same physical segment. It will be shown that a signal from the data can be extracted that indicates how misaligned a measurement and reference segment are in physical distance during the extraction of the spectral response. With this measure of alignment in physical distance, the segment data sets may be realigned so that an accurate measurement of the spectral phase distortion as a result of motion may be determined.

Taking a step back from this problem, the inventors observed that both the effects of axial strain and vibration accumulate along the length of the sensing fiber. However, in a wide range of applications, both the rate of accumulation of vibration and change in axial strain are slowly varying across a small length of the sensor. As mentioned already, robust vibration correction includes segmenting a length of fiber into smaller segments for averaging, ensuring that these segments are temporally aligned with the same physical segments in the baseline measurement, and removing the strain present across the segments. Since both axial strain and vibration are slowly changing, a routine may be executed along the length of the fiber that measures small changes in temporal delay, axial strain, and vibration along the length of the sensor and accumulates these changes. Hence, a feedback loop of sorts is established as the algorithm advances along the length of the fiber.

A property of the Fourier transform may be used to measure the temporal delay between a reference and measurement segment. If the reference and measurement are not aligned in the delay domain, then a slope manifests on the phase response in the spectral domain. Thus, one can detect if the reference and measurement are misaligned by extracting the argument of the product between the reference and measurement segment in the spectral domain. In other words, the deviations of the spectral phase response from linearity capture the distortions as a result of motion, and the slope of this phase response is an indicator of how misaligned the reference and measurement segments are in the delay domain. This is described by the following mathematical analysis:

A delay in the time domain is a linear phase term in the frequency domain as shown with Eq. 1, Eq. 2, and Eq. 3.

$$f(t) = \frac{1}{2\pi} \int_{-\infty}^{\infty} F(\omega) e^{-i\omega t} d\omega \qquad \text{Eq. 1}$$

$$f(t + \Delta t) = \frac{1}{2\pi} \int_{-\infty}^{\infty} F(\omega) e^{-i\omega(t + \Delta t)} d\omega \qquad \text{Eq. 2}$$

$$f(t + \Delta t) = \frac{1}{2\pi} \int_{-\infty}^{\infty} e^{-i\omega \Delta t} F(\omega) e^{-i\omega t} d\omega \qquad \text{Eq. 3}$$

Figure 32:
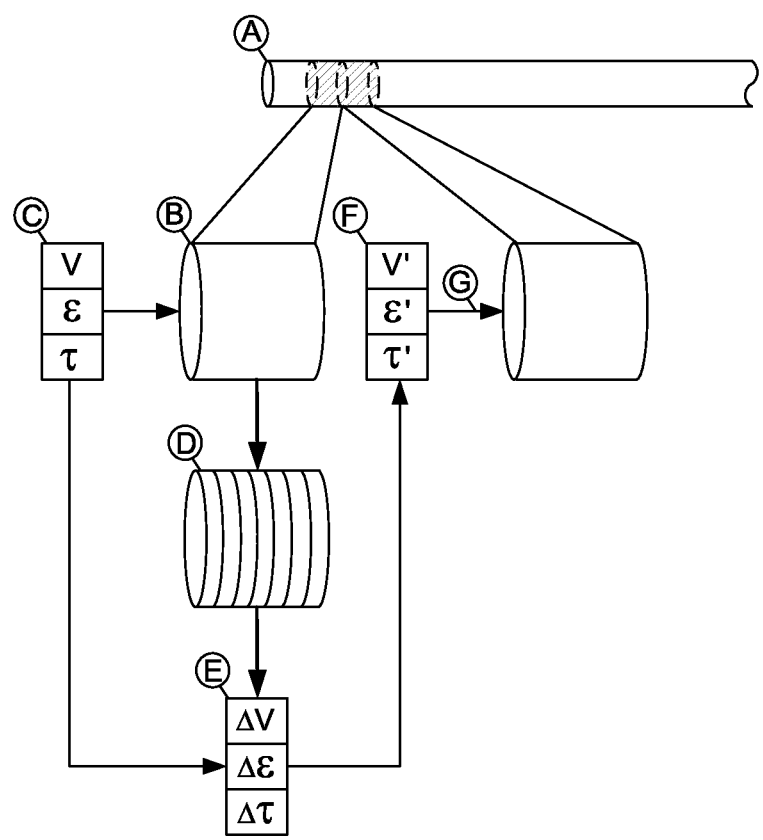
FIG. 32 illustrate an example feedback process that may be executed along the length of the fiber correcting for accumulated vibration, accumulated strain, and delay mismatch between the reference and measurement segments.

With a measure of vibration, temporal misalignment, and strain across a length of sensing fiber, a feedback loop can be established that advances along the length of the sensing fiber. An example, computer-implemented feedback algorithm is depicted in FIG. 32 that may be executed along the length of the fiber correcting for accumulated vibration, accumulated strain, and delay mismatch between the reference and measurement segments. First, a measurement length is chosen that is equal to the number of segments that will be used in the averaging of the spectral responses (step A). Each length is corrected for vibration (v) up to that point, strain ($\varepsilon$) present across the length is removed, and the measurement data set for this segment is compared to the reference data set for the correct segment of fiber in the baseline reference based on the delay signal ($\tau$) (step B). The algorithm assumes that these feedback signals v, $\varepsilon$, and $\tau$ are all determined during initialization within the processing of the OFDR system. The measurement length is corrected using feedback signals v, $\varepsilon$, and $\tau$ at (step C). As described previously, vibration (v), can be removed by applying a phase correction to the spectral domain of the measurement that is based on the distortion as a result of motion up to that location in the sensor. Strain ($\varepsilon$) across the measurement length is removed by applying a phase slope across the data in the temporal domain that is proportional to the strain. Misalignment in physical distance, or delay ($\tau$), is accounted for by indexing the baseline data according to this measure of misalignment. Once corrected, the measurement length is divided into smaller segment measurement data sets (step D) to average the spectral phase response providing a robust measure of the effects of motion using the example techniques described above. The smaller segments allow measurement of a change in the distortion as a result of motion ($\Delta v$), a change in strain across the segments ($\Delta \varepsilon$), and a change in the delay mismatch ($\Delta \tau$) between the reference and measurement (step E). These changes $\Delta v$, $\Delta \varepsilon$, and $\Delta \tau$ are accumulated with the previous values v, $\varepsilon$, and $\tau$ to produce a new set of values v', $\varepsilon$', and $\tau$' (step F). Assuming that the signals are slowly varying along the length of the sensor, these accumulated values v', $\varepsilon$', and $\tau$' are a good approximation of the necessary signals needed to correct the next measurement length (G). The processing is repeated moving along the length of the sensor fiber slowly removing and monitoring the change in strain along the fiber, the change in accumulated distortion as a result of motion, and the accumulated delay.

OFDR is a valuable technique for performing high resolution distributed strain measurements. In many applications, it is desired to perform measurements at a distance away from the measurement system. In some situations of extreme environments, the instrument cannot be placed near the sensing fiber. As an example, if the sensing fiber was deployed in a cryogenic chamber, the instrument could not be operated in the proximity of the sensing fiber. A length of fiber, such as a patchcord, would have to be placed between the measurement and the sensing region of the fiber. The length of fiber between the measurement system and the sensing region of the fiber effectively serves as an antenna that receives both mechanical and acoustic disturbances. These disturbances distort the measurement in the sensing region of the fiber, greatly diminishing the effectiveness of the OFDR measurement. The above described compensation technology allows a measurement to be performed at the beginning of a sensing region that can be used to remove the disturbances received by the sensor fiber. As a result, OFDR measurement techniques are more effectively deployed in a wide range of applications and environments.

Although various embodiments have been shown and described in detail, the claims are not limited to any particular embodiment or example. None of the above description should be read as implying that any particular member, step, range, or function is essential such that it must be included in the claims scope. The scope of patented subject matter is defined only by the claims. The extent of legal protection is defined by the words recited in the allowed claims and their equivalents. All structural and functional equivalents to the members of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An optical interrogation system for measuring a parameter of a sensing light guide, the optical interrogation system comprising:
    an optical interferometric interrogator configured to couple to the sensing light guide;
    optical detection circuitry configured to convert optical interferometric measurement signals received from the optical interferometric interrogator for the sensing light guide into electrical signals; and
    data processing circuitry configured to:
    receive the electrical signals from the optical detection circuitry;
    generate, from the electrical signals, an interferometric measurement data set in a delay domain;
    transform at least a segment of the interferometric measurement data set into a spectral domain to produce a transformed interferometric measurement data set in the spectral domain;
    compare the transformed interferometric measurement data set to a baseline interferometric data set in the spectral domain to identify a time-varying phase difference signal in the spectral domain, the time-varying phase difference signal corresponding to a time-varying disturbance, the baseline interferometric data set being generated from baseline optical interferometric signals acquired for the sensing light guide in a baseline environment where the sensing light guide was not being subjected to the time-varying disturbance;
    determine a compensating signal from the time-varying phase difference signal; and
    use the compensating signal to compensate at least a portion of the interferometric measurement data set for the time-varying disturbance as part of producing a measurement of the parameter.

2. The optical interrogation system in claim 1, wherein the optical interrogation system is an optical frequency domain reflectometry (OFDR)-based system that includes an interrogating light source, and wherein the interferometric measurement signals indicate back scatter amplitude, as a function of time, of light scattered along the sensing light guide.

3. The optical interrogation system in claim 2, wherein the OFDR-based system includes an interrogating light source monitor network, and wherein the optical detection circuitry is further configured to:
    detect reference signals from the interrogating light source monitor network; and
    provide the reference signals to the data processing circuitry.

4. The optical interrogation system in claim 1, wherein the interferometric measurement data set is determined for a reflective event in the interferometric measurement data set using a window around the reflective event.

5. The optical interrogation system in claim 1, wherein determining the compensating signal from the time-varying phase difference signal comprises:
    unwrapping the phase difference signal to produce an unwrapped phase difference signal.

6. The optical interrogation system in claim 1, wherein the compensating signal is an unwrapped phase difference signal, and wherein the data processing circuitry is configured to subtract the compensating signal from the transformed interferometric measurement data set in the spectral domain and transform a resulting compensated transformed interferometric measurement data set back into the delay domain to thereby compensate the at least a portion of the interferometric measurement data set for the time-varying disturbance.

7. The optical interrogation system in claim 1, wherein:
    the data processing circuitry is further configured to divide the interferometric measurement data set in the delay domain into multiple data segments;
    transforming the at least a segment of the interferometric measurement data set into the spectral domaining comprises transforming each of the multiple data segments into the spectral domain to obtain multiple transformed data segments, the multiple transformed data segments collectively forming the transformed interferometric data set; and
    comparing the transformed interferometric measurement data set to the baseline interferometric data set in the spectral domain comprises producing combined segments by combining multiple transformed data segments with corresponding reference data segments from the baseline interferometric data set in the spectral domain, averaging the combined segments, and extracting the time-varying phase difference signal from the averaged combined segments.

8. The optical interrogation system in claim 1, wherein the data processing circuitry is further configured to:
    divide the interferometric measurement data set into multiple data segments;
    process adjacent data segments of the multiple data segments to determine an associated strain, where the associated strain indicates an amount of misalignment between the adjacent data segments; and
    use the associated strain for data segment alignment in the spectral domain.

9. The optical interrogation system in claim 1, wherein:
    the data processing circuitry is further configured to divide the interferometric measurement data set into multiple data segments;

transforming the at least a segment of the interferometric measurement data set into the spectral domain comprises transforming each of the multiple data segments into the spectral domain to obtain multiple transformed data segments, the multiple transformed data segments collectively forming the transformed interferometric data set; and comparing the transformed interferometric measurement data set to the baseline interferometric data set in the spectral domain comprises:

determining a temporal delay that indicates an amount of misalignment in the delay domain between the multiple transformed data segments and multiple reference data segments of the baseline interferometric data set, using the temporal delay to temporally align the multiple reference data segments with the multiple transformed data segments in the delay domain, and comparing each data segment of the multiple transformed data segments to a corresponding temporally aligned reference data segment of the baseline interferometric data set in the spectral domain to identify the time-varying phase difference signal.

10. The optical interrogation system in claim 1, wherein the sensing light guide is an optical fiber, and wherein the data processing circuitry is configured to:

compensate the interferometric measurement data set for a strain on the optical fiber.

11. The optical interrogation system in claim 1, wherein the data processing circuitry is configured to determine and compensate for accumulated motion, temporal misalignment, and strain along the sensing light guide.

12. A method for measuring a parameter of a sensing light guide, the method comprising:

detecting optical interferometric measurement signals for the sensing light guide and converting the interferometric measurement signals into electrical signals;

generating, from the electrical signals, an interferometric measurement data set in a delay domain;

transforming at least a segment of the interferometric measurement data set into a spectral domain to produce a transformed interferometric measurement data set in the spectral domain;

comparing the transformed interferometric measurement data set to a baseline interferometric data set in the spectral domain to identify a time-varying phase difference signal in the spectral domain, the time-varying phase difference signal corresponding to a time-varying disturbance, the baseline interferometric data set being generated from baseline optical interferometric signals acquired for the sensing light guide in a baseline environment where the sensing light guide was not being subjected to the time-varying disturbance;

determining a compensating signal from the time-varying phase difference signal; and using the compensating signal to compensate at least a portion of the interferometric measurement data set for the time-varying disturbance as part of producing a measurement of the parameter.

13. The method in claim 12, wherein the method uses an optical frequency domain reflectometry (OFDR)-based system that includes an interrogating light source, and wherein the interferometric measurement signals indicate back scatter amplitude, as a function of time, of light scattered along the sensing light guide.

14. The method in claim 12, further comprising determining the interferometric measurement data set using a measurement window around a reflective event in the interferometric measurement data set.

15. The method in claim 12, wherein determining the compensating signal from the time-varying phase difference signal comprises:

unwrapping the phase difference signal to produce an unwrapped phase difference signal.

16. The method in claim 12, wherein the compensating signal is an unwrapped phase difference signal, and wherein using the compensating signal to compensate at least some portion of the interferometric measurement data set comprises:

subtracting the compensating signal from the transformed interferometric measurement data set in the spectral domain and transform a resulting compensated transformed interferometric measurement data set back into the delay domain to thereby compensate the at least a portion of the interferometric measurement data set for the time-varying disturbance.

17. The method in claim 12, wherein:

the method further comprises dividing the interferometric measurement data set into multiple data segments;

transforming the at least a segment of the interferometric measurement data set into the spectral domaining comprises: transforming each of the multiple data segments into the spectral domain to obtain multiple transformed data segments collectively forming the transformed interferometric measurement data set; and comparing the transformed interferometric measurement data set to the baseline interferometric data set in the spectral domain comprises:

producing combined segments by combining multiple transformed data segments with corresponding reference data segments from the baseline interferometric data set in the spectral domain, averaging the combined segments and extracting the time-varying phase difference signal from the averaged combined segments.

18. The method in claim 12, further comprising:

dividing the interferometric measurement data set into multiple data segments;

processing adjacent data segments of the multiple data segments to determine an associated strain, where the associated strain indicates an amount of misalignment between the adjacent data segments, and using the associated strain for data segment alignment in the spectral domain.

19. The method in claim 12, wherein:

the method further comprises dividing the transformed interferometric measurement data set into multiple data segments;

transforming the at least a segment of the interferometric measurement data set into the spectral domaining comprises: transforming each of the multiple data segments into the spectral domain to obtain multiple transformed data segments, the multiple transformed data segments collectively forming the transformed interferometric measurement data set; and comparing the transformed interferometric measurement data set to the baseline interferometric data set in the spectral domain comprises:

determining a temporal delay that indicates an amount of misalignment in the delay domain between the multiple data segments and multiple reference data segments of the baseline interferometric data set, using the temporal delay to temporally align the multiple reference data segments with the multiple transformed data segments in the delay domain, and comparing each data segment of the multiple transformed data segments to a corresponding temporally aligned reference data segment of the baseline interferometric data set in the spectral domain to identify the time-varying phase difference signal.

20. The method in claim 12, wherein the sensing light guide is an optical fiber, and wherein the method further comprises: compensating the interferometric measurement data set for a strain on the optical fiber.

21. The method in claim 12, further comprising:
determining and compensating for accumulated motion, temporal misalignment, and strain along the sensing light guide.

22. An optical interrogation system for measuring a parameter of a sensing light guide, the optical interrogation system comprising:
an optical interferometric interrogator configured to couple to the sensing light guide;
optical detection circuitry configured to convert optical interferometric measurement signals received from the optical interferometric interrogator for the sensing light guide into electrical signals; and
data processing circuitry configured to:
receive the electrical signals from the optical detection circuitry,
generate, from the electrical signals, an interferometric measurement data set in a delay domain,
divide the interferometric measurement data set into multiple data segments,
transform the multiple data segments into a spectral domain to produce multiple transformed data segments, the multiple transformed data segments collectively forming a transformed interferometric data set,
compare the transformed interferometric data set to a baseline interferometric data set in the spectral domain by:
determining a temporal delay that indicates an amount of misalignment in the delay domain between the multiple transformed data segments and multiple reference data segments of the baseline interferometric data set,
using the temporal delay to temporally align the multiple reference data segments with the multiple transformed data segments in the delay domain, and
comparing each data segment of the multiple transformed data segments to a corresponding temporally aligned reference data segment of the baseline interferometric data set in the spectral domain to identify a time-varying phase difference signal in the spectral domain, the time-varying phase difference signal corresponding to a time-varying disturbance,
the baseline interferometric data set being generated from baseline optical interferometric signals acquired for the sensing light guide in a baseline environment where the sensing light guide was not being subjected to the time-varying disturbance;
determine a compensating signal from the time-varying phase difference signal; and
use the compensating signal to compensate at least a portion of the interferometric measurement data set for the time-varying disturbance as part of producing a measurement of the parameter.

23. The optical interrogation system in claim 22, wherein the data processing circuitry is further configured to:
process adjacent data segments of the multiple data segments to determine an associated strain, where the associated strain indicates an amount of misalignment between the adjacent data segments; and
use the associated strain for data segment alignment in the spectral domain.

24. The optical interrogation system of claim 22, wherein comparing each data segment of the multiple transformed data segments to a corresponding temporally aligned reference data segment of the baseline interferometric data set in the spectral domain comprises:
producing combined segments by combining each of the multiple transformed data segments with the corresponding temporally aligned reference data segment in the spectral domain,
averaging over the combined segments, and
extracting the time-varying phase difference signal from the averaged combined segments.

* * * * *

UNITED STATES PATENT AND TRADEMARK OFFICE
CERTIFICATE OF CORRECTION

PATENT NO. : 11,193,751 B2
APPLICATION NO. : 16/044559
DATED : December 7, 2021
INVENTOR(S) : Froggatt et al.

Page 1 of 1

It is certified that error appears in the above-identified patent and that said Letters Patent is hereby corrected as shown below:

On the Title Page

On page 2, in Column 2, item (56) under "Other Publications", Line 3, delete "openion" and insert --opinion-- therefor In the Claims In Column 20, Lines 52-53, in Claim 19, after "comprises:", insert a linebreak In Column 21, Line 8, in Claim 20, after "comprises:", insert a linebreak Signed and Sealed this
Eighth Day of February, 2022

Drew Hirshfeld
*Performing the Functions and Duties of the
Under Secretary of Commerce for Intellectual Property and
Director of the United States Patent and Trademark Office*